United States Patent [19]

Lubarsky et al.

[11] Patent Number: 5,062,104
[45] Date of Patent: Oct. 29, 1991

[54] DIGITAL SERVICE UNIT FOR CONNECTING DATA PROCESSING EQUIPMENT TO A TELEPHONE SYSTEM BASED COMPUTER NETWORK

[75] Inventors: Daniel P. Lubarsky, San Jose; George A. Weigt, Livermore; Mark E. Haisch, Freemont, all of Calif.

[73] Assignee: Pacific Bell, San Francisco, Calif.

[21] Appl. No.: 249,400

[22] Filed: Sep. 26, 1988

[51] Int. Cl.⁵ .................... H04L 9/00; H04Q 11/04
[52] U.S. Cl. .................................. 370/60; 370/94.1; 370/92; 370/112; 379/93
[58] Field of Search .................... 379/93, 88, 284; 370/60, 94, 92, 88, 110.1, 77, 112, 85.12; 340/825.5

[56] References Cited

U.S. PATENT DOCUMENTS

| | | | |
|---|---|---|---|
| 4,381,427 | 4/1983 | Cheal et al. | 379/93 |
| 4,527,012 | 7/1985 | Caplan et al. | 379/284 |
| 4,578,538 | 3/1986 | Pascucci et al. | 379/93 |
| 4,745,601 | 5/1988 | Diaz et al. | 370/110.1 |
| 4,750,169 | 6/1988 | Carse et al. | 370/110.1 |
| 4,893,340 | 1/1990 | Lubarsky et al. | 370/60 |

OTHER PUBLICATIONS

Dunbar et al., "Dataport-Channel Units for Digital Data System 56-kb/s Rate", *The Bell System Technical Journal*, vol. 61, No. 9, Nov. 1982, pp. 2741-2756.

Albert, W. G. et al., "Digital Terminal Physical Design", *The Bell System Technical Journal*, vol. 61, No. 9, Nov. 1982, pp. 2757-2790.

*Primary Examiner*—Benedict V. Safourek
*Assistant Examiner*—Alpus H. Hsu
*Attorney, Agent, or Firm*—McCubbrey, Bartels, Meyer & Ward

[57] ABSTRACT

An apparatus for coupling data processing equipment to subscriber loops in a telephone system based computer network is disclosed. The multipoint communication network includes a plurality of network units with at least two of the network units comprising the apparatus in question. The network units are coupled to telephone system communication links. The network units transmit and receive digital data in a frame mode in which the data is organized into frames on the communication links. The network units also communicate with each other in a manner which allows the configuration and speed of the network to varied in response to the time of day and error rates observed on the telephone system communcation links.

15 Claims, 5 Drawing Sheets

DIGITAL SERVICE UNIT FOR CONNECTING DATA PROCESSING EQUIPMENT TO A TELEPHONE SYSTEM BASED COMPUTER NETWORK

BACKGROUND OF THE INVENTION

The present invention relates to an apparatus for use in networks which connect a plurality of computers to form a computer network and, more particularly, to apparatus for connecting data processing equipment to telephone lines.

Many businesses have computer networks which extend over large geographic areas. The most economical manner for implementing such networks utilizes existing telephone lines to connect the various computers in the network. Computer networks that utilize the telephone system are known to the prior art. However, these computer networks are less than ideal. Problems arise from the use of transmission facilities which were designed for voice quality transmissions between two points and from the inclusion of components which are owned and maintained by separate commercial entities. However, because of the cost savings which are inherent in the use of the existing telephone system, it is desirable to adapt such network equipment for acceptable digital data transmission, if at all possible.

Existing computer networks suffer from a number of drawbacks. For example, prior art computer networks which utilize the telephone system are difficult to reconfigure either with regard to the speed at which data is transmitted within the telephone system or with regard to the topological configuration of the computer network. In prior art computer networks, telephone company technicians must be dispatched to various locations within the telephone system to affect a rate change in the computer network. If the new rate is not one of a small number of rates for which the equipment is designed, the actual interface circuitry within the telephone system must often be changed. As a result, it is practically impossible to change data rates in response to short term changes in the quality of the telephone lines carrying the data.

Short term increases in the noise on specific telephone lines are common. The telephone lines used for carrying the user's computer data are, in general, identical to the lines used to carry voice communications within the telephone system. These lines are bundled into cables with similar lines. The noise level on these lines depends upon a number of factors including the nature of the transmissions on lines bundled with those used for the computer network along routes which include a variety of different telephone company switching equipment.

To change the network speed or configuration, changes must be made in equipment which is neither owned nor maintained by the computer network owner. This makes reconfiguration of the network difficult, since telephone company personnel must be coordinated with those of the network owner to effect a change.

Ideally, a network owner would like to be able to change the configuration of the network in response to observed error rates or the time of the day. Such reconfiguration, for example, would be useful in smoothing peak loads on the computer network. Such reconfigurability would also be useful in transferring specific services to offices in earlier time zones when the office providing the service in another time zone closes at the end of the day. In prior art systems, such reconfiguration requires that key components of the computer network be rewired by telephone company personnel or that special purpose hardware be installed at significant cost.

Another example of a drawback in prior art computer networks is the inability of the user to monitor and manage the computer network. If a failure occurs in the computer network, it is difficult to ascertain whether the failure is the result of a malfunction in the equipment supplied by the telephone company, either on or off of the network owner's premises, or in the equipment owned and maintained by the network owner. Hence, when a malfunction is detected, telephone company technicians are often needed to ascertain the location of the failure within the system. The time delays in waiting for such determinations to be made are often unacceptable. It would be advantageous to provide a means for allowing the network user to set loopbacks and other diagnostic aids within the computer network without the time delays and added expense inherent when telephone company personnel must be involved. Similarly, the computer network user would like to be able to access data showing error rates on the various communication links in the computer network.

A typical multipoint network having a master computer and a plurality of slave computers and utilizing the telephone system requires an apparatus for connecting the various computers to the telephone system. Such apparatuses will be referred to herein after as digital service units. Prior art digital service units do not provide the adaptive and control capabilities described above. In general, they allow the user to select one of a small number of data transmission speeds. Furthermore, they do not provide user access to the other devices within the telephone system which are used in transmitting the user's data.

Broadly, it is an object of the present invention to provide an improved digital service unit for use in computer networks utilizing the telephone system.

It is another object of the present invention to provide a means for accessing error rate data and data concerning the status of the network units internal to the telephone system without the intervention of telephone system personnel.

A related object of the present invention is to provide a digital service unit which can automatically adjust the data rates of the computer network in response to error rates detected by other digital service units in the computer network.

It is a further object of the present invention to provide a digital service unit which can be configured to be either a master digital service unit or a slave digital service unit without the intervention of telephone system personnel.

These and other objects of the present invention will become apparent to those skilled in the art from the following detailed description of the invention and the accompanying drawings.

SUMMARY OF THE INVENTION

The present invention comprises a digital service unit for transferring digital data between first and second subscriber loops and a data processor forming part of a computer network in a multipoint network which includes a plurality of network units with at least one of said network units comprising said digital service unit. The network units are coupled to telephone system communication links, each said network unit comprising means for transmitting and receiving digital data in a framed mode in which said data is organized into frames on said communication links. Each said frame includes synchronization data, command data, error correcting data, and user data. Each of the network units further comprises a means for storing an address identifying said network unit, a means for receiving commands from other said network units in said computer network, said commands being specified by command data in a said frame received by said network unit, a means for generating command data in response to a received command included in said command data, a means for transmitting commands to other network units in said computer network, said transmitting means comprising a means for inserting command data generated by said command data generating means into a said frame transmitted by said network unit, and a means for executing a said received command specifying said stored address as the target thereof.

The digital service unit of the present invention further comprises a computer port for transmitting user data to and receiving user data from said data processor. The digital service unit also includes a means for generating a said frame including said received user data. The present invention also includes a subscriber loop output port means for transmitting said frame generated by said frame generating means on said first subscriber loop, and a subscriber loop input port means for receiving a said frame on said second subscriber loop. Finally the present invention includes a means for separating the said user data from said received frame and for transmitting said user data on said computer port means.

DETAILED DESCRIPTION OF THE INVENTION

Introduction

The digital service unit to which the present invention, hereinafter referred to as an adaptive digital service unit, is best understood with reference to networks in which the apparatus attains many of its advantages. Hence, before proceeding with a detailed explanation of the adaptive digital service unit of the present invention, a discussion of a simple computer network utilizing the adaptive digital service unit will be given.

Figure 1:
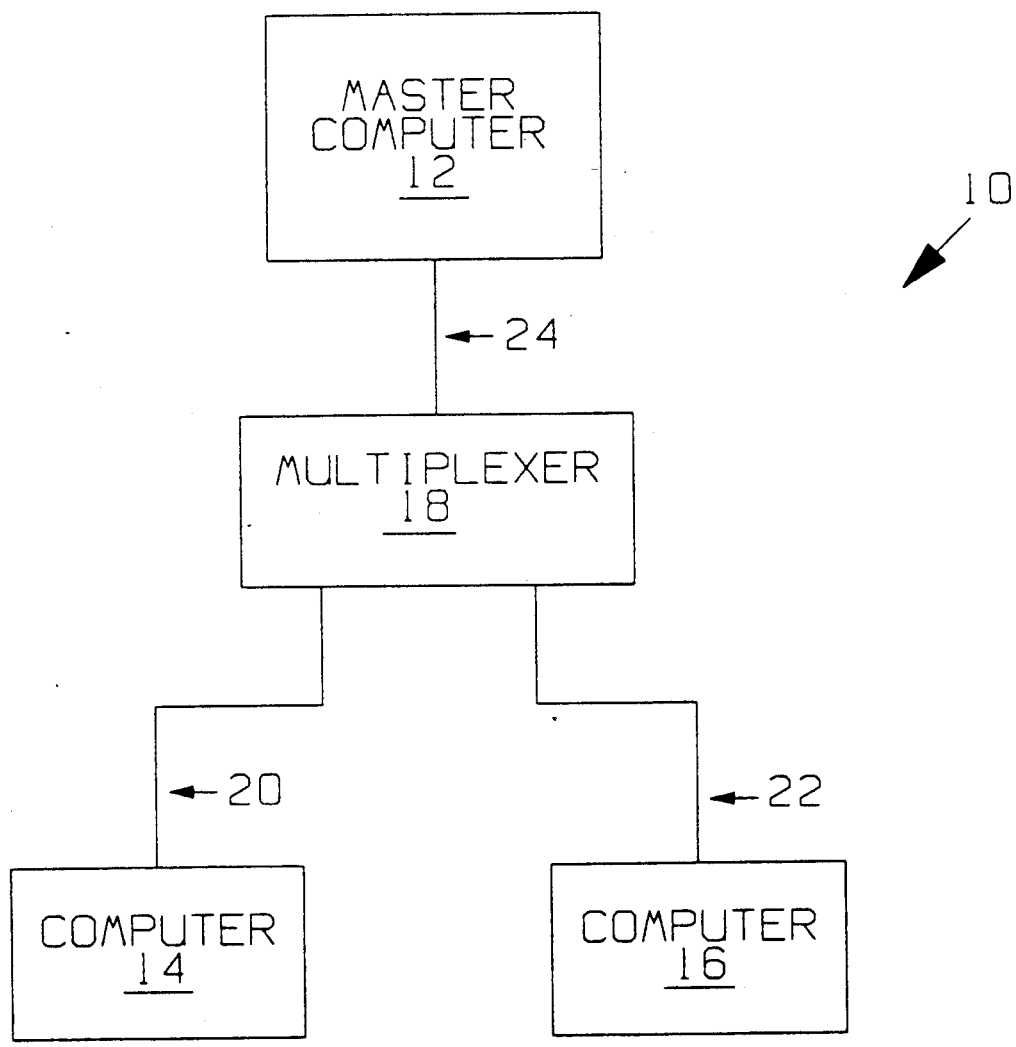
FIG. 1 is a block diagram of a simple computer network.

An example of a simple computer network 10 is shown in FIG. 1. Computer network 10 includes three computers 12, 14 and 16. Computer 12 is the master computer. Computers 14 and 16 are remote or slave computers which communicate with master computer 12 under the control of master computer 12.

A multiplexer 18 communicates each command from master computer 12 on a communication link 24 to both of the slave computers by copying each command input to it on communication link 24 onto branch communication links 20 and 22. Hence, each slave computer receives all commands transmitted by master computer 12. Each such command is addressed either to both of the slave computers or to a specified one of them. Each slave computer is programmed to respond only to those commands directed to it.

Multiplexer 18 combines the data streams sent by each of the slave computers 14 and 16 on communication links 20 and 22, respectively. The "combining" operation is typically an ORing of the data in each data stream. The combined data is then transmitted to master computer 12 on communication link 24. Hence, slave computers 14 and 16 must be programmed to respond to commands from master computer 12 one at a time. This is normally accomplished by using a polling protocol. Master computer 12 sends a command to one of the slave computers requesting information. The slave computer in question then responds. The other slave computer is programmed to be silent during this response.

Figure 2:
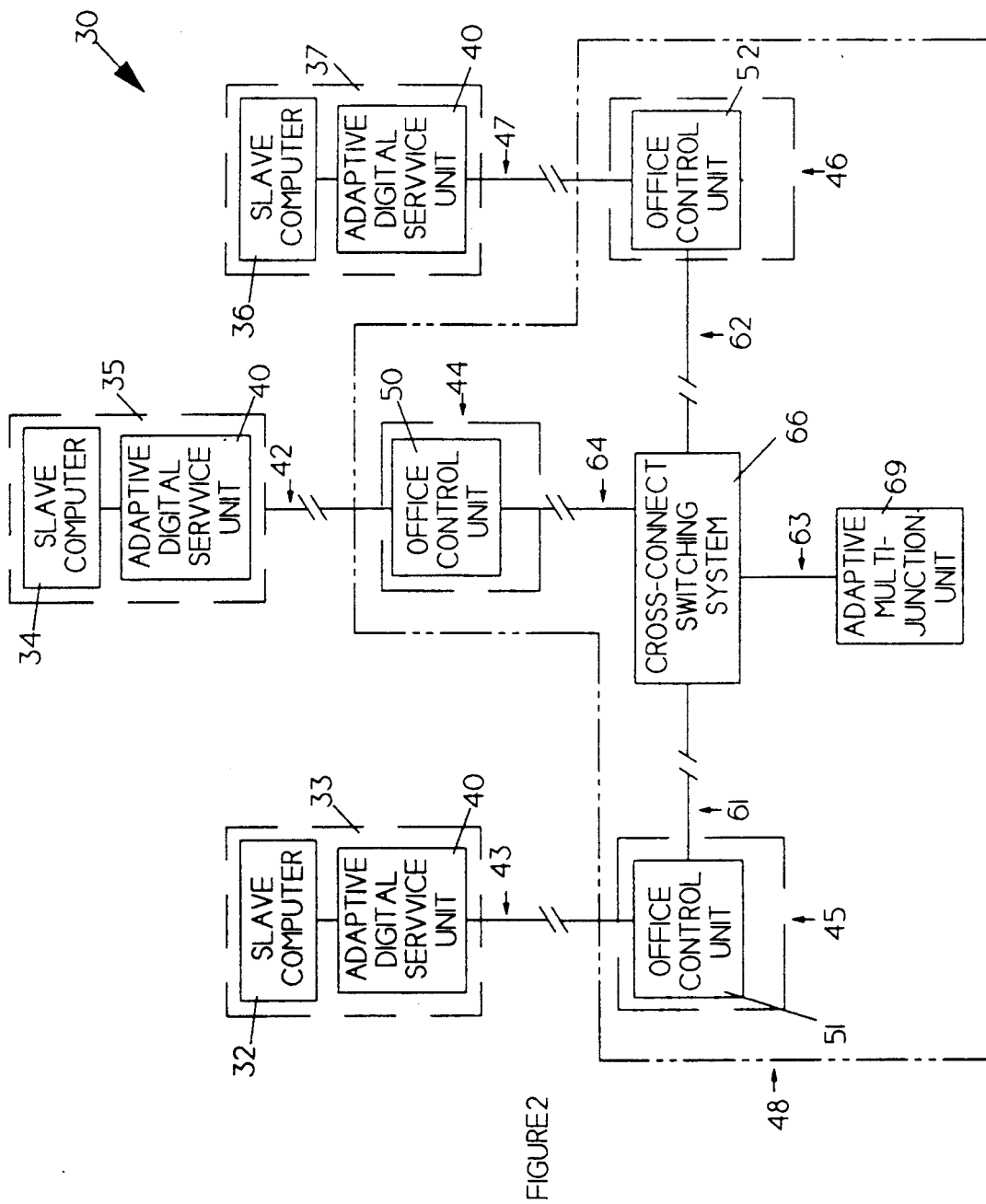
FIG. 2 is a block diagram of a telephone system based implementation of the computer network shown in FIG. 1 which utilizes the present invention.

A block diagram of a telephone system-based implementation of computer network 10 is shown in FIG. 2 at 30. Computer network 30 includes a master computer 32 at location 33, a slave computer 34 at location 35 and a slave computer 36 at location 37. Each computer sends data to and from a first network through an adaptive digital service unit 40 according to the present invention located on the same premises as the computer in question. Data is communicated between the adaptive digital service unit 40 and the computer connected thereto in a standard digital format such as RS-232.

The various adaptive digital service units of the network format the computer data for transmission to and from a telephone central office servicing the network over a pair of conventional subscriber loops of the type used for normal voice communications. In computer network 30, master computer 32 communicates with central office 45 over the subscriber loops shown at 43. Similarly, slave computer 34 communicates with central office 44 over subscriber loops 42, and slave computer 36 communicates with central office 46 over subscriber loops 47. To clarify FIG. 2, the subscriber loops in question are shown as a single communication path in the figure. However, it is to be understood that each such path comprises two subscriber loops, one for transmitting data in each direction relative to the central office. The central offices in question are all part of a telephone system 48.

Each pair of subscriber loops terminates on a second network component referred to as an adaptive office control unit. In computer network 30, subscriber loops 42, 43, and 47, terminate on adaptive office control units 50, 51, and 52, respectively. The adaptive office control units reformat the data on the subscriber loops connected thereto to a format compatible with conventional $T_1$ communication links (within telephone system 48. Exemplary $T_1$ communication links are indicated at 61-64.

Computer network 30 also includes an adaptive multijunction unit 69 which is a third type of network unit and which performs functions analogous to multiplexer 18 shown in FIG. 1. The adaptive multijunction unit 69 copies the data input to it on specified channels of $T_1$ communication link 63 which are assigned to adaptive office control unit 51 to a set of channels on $T_1$ communication link 63 which are assigned to adaptive office control units 52 and 50. In addition, adaptive junction unit 69 ORs the data input to it on the $T_1$ channels assigned to adaptive office control units 50 and 52 and transmits the ORed data on the channels assigned to office control unit 51.

Telephone system 48 includes a cross-connect system 66 which is utilized for routing data between the $T_1$ channels of the various $T_1$ communication links. For example, cross-connect system 66 routes the data placed in preassigned channels of $T_1$ communication link 62 by office control unit 52 to the appropriate channels of $T_1$ communication link 63 where it is operated on by adaptive multijunction unit 69. Cross-connect system 66 is constructed from a number of cross-connect switches located at different geographical locations within telephone system 48; however, for simplicity, it is shown as a single block in the figure.

In addition to communicating data to and from the various computers in the computer network, the adaptive digital service units, adaptive office control units, and the adaptive multijunction units communicate with each other to effect a number of useful network management functions. In one sense, a computer network utilizing the present invention comprises two computer networks. The first computer network consists of the user's computers, i.e., master computer 32 and slave computers 34 and 36 shown in FIG. 2. The second network consists of the adaptive digital service units, adaptive office control units, and adaptive multijunction units. The elements of this second network communicate with each other over the same telephone lines used by the computers in the first network. This second computer network will be referred to as the telephone system computer network in the following discussion.

Each of the elements in the telephone system computer network includes an onboard dedicated computer which will be referred to as a process and control circuit or microprocessor to distinguish it from the computers in the user's computer network. These process and control circuits send and receive instructions and data to each other on the same communication links used for transmitting data between the various computers in the computer network. These process and control circuits are also responsible for monitoring and, in some cases, taking actions which correct and/or reduce transmission errors within the telephone system computer network.

The communication links used in the present invention are designed for carrying voice quality data. Digital data of the type communicated in a computer network requires a much lower error rate than voice data. The error rates in question may depend on other data being transmitted on adjacent lines in the telephone system, and hence, can vary with the time of day and other environmental factors. The various network units, i.e., adaptive digital service units, adaptive office channel units, and adaptive multijunction units, include circuitry for correcting some of the transmission errors. In addition, all of the process and control circuits are coupled to circuitry which monitors error rates on the communication links connected thereto and reports those error rates to the adaptive office channel unit connected to the master computer, which may take action to reduce the error rates by sending commands to the various process and control circuits throughout the network.

A computer network utilizing the present invention provides superior error-related network management features which maximize the data throughput of the telephone system computer network while keeping error rates at acceptable levels. For example, the process and control circuits may be used to change the rate at which data is transmitted in the telephone system computer network. By adjusting the data rates, transmission errors resulting from noise are often significantly reduced.

In prior art systems, data transmission rates could only be changed by sending technicians to the various geographical areas within the telephone system. Furthermore, changing the data rates often required replacing the equipment within the system. Hence, the data rates could not be optimally adjusted in response to transitory conditions having a relatively limited time span. As a result, the data rates were often set at values which were significantly below the maximum data rates which could be sustained over the majority of the network operation hours. In a computer network utilizing the present invention in conjunction with the adaptive office control units and adaptive multijunction units described herein, the data transmission rates may be automatically reduced when unsatisfactory error rates are observed and then automatically increased when the condition causing the error rates subsides. Thus, the mean data transmission rate in the present invention is significantly higher than that obtained in prior art networks.

The manner in which the present invention operates requires a knowledge of the various data formats and communication protocols utilized in a computer network which employs the present invention. The computer network in question communicates in two data formats which will be referred to as the framed and unframed formats. The framed format which is utilized at transmission rates below 64 Kbits/sec will be described first.

Figure 3:
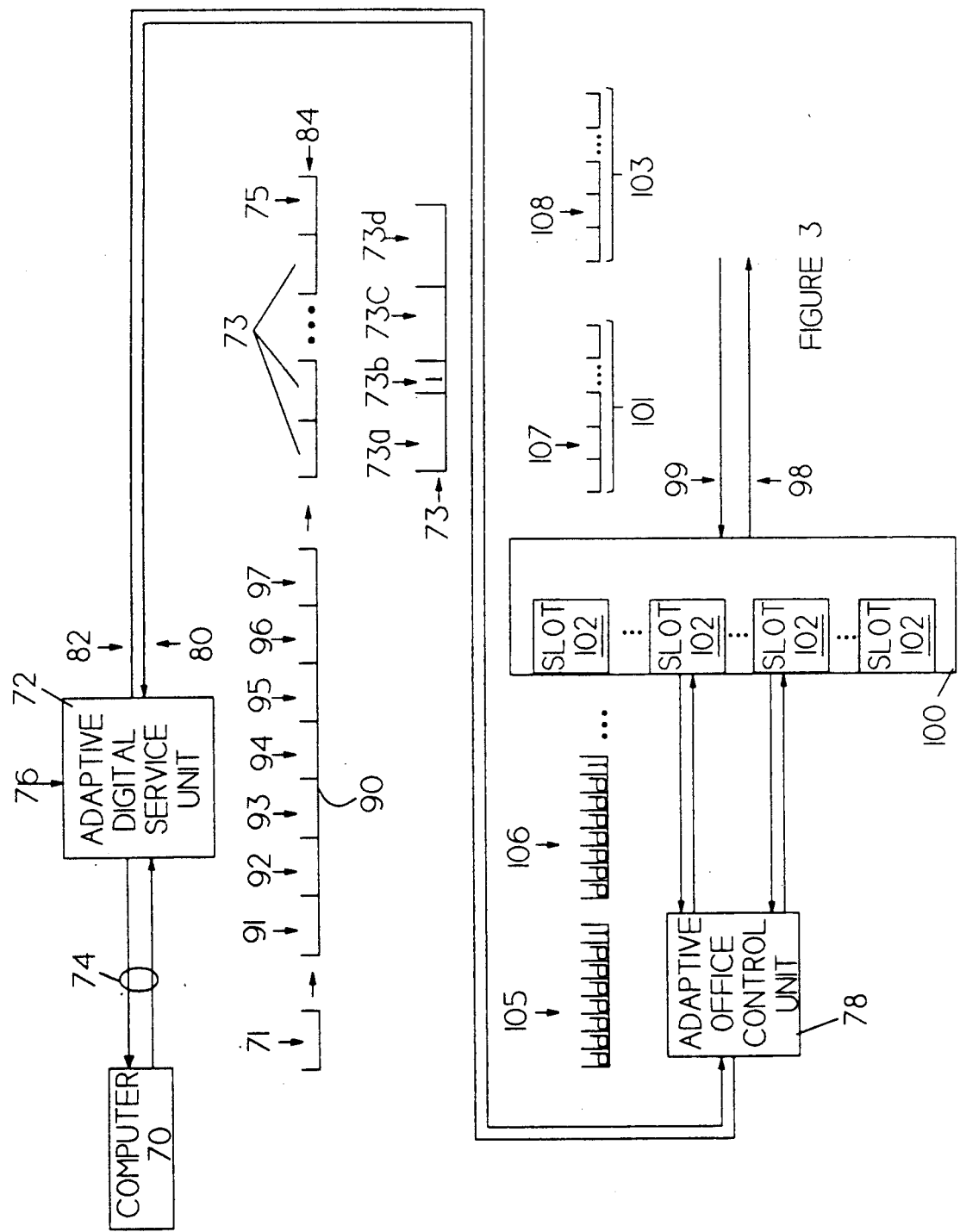
FIG. 3 illustrates the formatting of data transferred between a user's computing equipment and telephone company $T_1$ communication links.

FIG. 3 illustrates an interface between the user's computing equipment and a $T_1$ communication link via two subscriber loops. A user's computer 70 communicates with an adaptive digital service unit 72 according to the present invention over a serial communication line 74 which links other computers in the user's computer network through the telephone system. The user may also communicate with the various elements of the telephone system computer network through a command port 76 in adaptive digital service unit 72. Adaptive digital service unit 72 communicates with an adaptive office control unit 78 over two subscriber loops 80 and 82. Subscriber loop 82 is used to send data to adaptive office control unit 78, and subscriber loop 80 is used to receive data from the adaptive office control unit. Communications on subscriber loops 80 and 82 are in a synchronous protocol which utilizes a clock in the telephone system for timing. When computer 70 communicates with adaptive digital service unit 72 in a synchronous protocol, it also uses this clock.

Data is communicated between computer 70 and adaptive digital service unit 72 in bytes, e.g., 8-bit words. A typical data byte is shown at 71. Adaptive digital service unit 72 accumulates a number of data bytes from computer 70 before transmitting the data to adaptive office control unit 78 on a subscriber loop 82. The data may be transferred in either the framed or unframed mode, with the latter allowing a higher data transmission rate.

When utilizing the framed mode, the data communicated between adaptive digital service unit 72 and adaptive office control unit 78 is preferably formatted in 560 bit packets which will be referred to as frames. Each frame includes user data plus additional "overhead" or "system" data used by process and control circuits of the present invention. This additional data includes synchronization data, command data, and error correcting data. A typical frame 84 is constructed from 17 32-bit elements 73 and a 16-bit block 75. Each element 73 contains four fields. The first field 73a consists of 16 data bits. The second field 73b consists of a "1" used to maintain synchrony within the telephone system. The third field 73c consists of 10 more data bits and the fourth field 73d consists of 5 bits used for detecting and correcting transmission errors. The 5 bits in question will be referred to as either an ECC word or ECC/CRC bits for reasons which will be discussed in detail below.

Each frame is created from a loop interface data frame which is also produced within adaptive digital service unit 72. The loop interface frame is shown at 90 in FIG. 3. Loop interface frame 90 consists of 7 fields. The first field 91 consists of a 16-bit synchronization word which is used to achieve and maintain system synchronization. This field is preferably equal to 1FDO in hexadecimal and referred to as the Barker code.

The second field 92 consists of a 16-bit command word which is used to signal the various process and control circuits in the telephone system computer network. The functions specified by this command word will be discussed in detail below. The third field 93 consists of a 16-bit address word identifying the device in the telephone system computer network to which the command in field 92 is directed.

The fourth field 94 consists of an 8-bit rate word which is used to communicate user data in an asynchronous transmission mode.

The fifth field 95 is a 2-bit signal word. One of these bits is used for security purposes, and the other specifies the number of user data bits which are actually being communicated in the frame.

The sixth field 96 contains the bulk of the user data, i.e., the data being communicated between the computers of the user's computer network. This field contains 384 bits.

Finally, the seventh field 97 contains a 16-bit word used to implement a secondary low speed communication channel referred to as a reverse channel below. The reverse channel allows a request to be sent to the master computer from one of the slave computers while the master computer is communicating with a different slave computer.

Adaptive digital service unit 72 accumulates data bytes 71 from computer 70 in a FIFO buffer. Data is read from this buffer to create frame 84. The number of bits read from this buffer depends on the speed at which the network is running and on the whether or not the computer network is running in a synchronous or asynchronous mode.

Adaptive digital service unit 72 also stores any commands input thereto on command port 76 until adaptive digital service unit 72 is ready to send the next frame 84 on subscriber loop 82. The time at which frames 84 are sent on subscriber loop 82 is determined by clock signals communicated to adaptive digital service unit 72 on subscriber loop 80.

The loop interface frame 90 is converted to frame 84 by the bitwise copying of successive data bits from loop frame 90 into the data bit fields of the elements of frame 84. The first element of frame 84 contains the 16 bits of the first field 91 of loop frame 90, followed by a "1", followed by the first 10 bits of the second field 92, followed by 5 ECC/CRC bits which are generated from the 26 bits of the first two elements using a conventional error correcting code. The added "1" guarantees that there is a sufficient density of one bits on the subscriber loops to maintain synchrony between the adaptive digital service unit and the adaptive office control unit connected thereto.

The second element of frame 84 contains the last 6 bits of command field 92 plus 10 bits of address field 93, followed by a "1", followed by the last bits of field 93 plus the first 4 bits of rate field 94, followed by the 5 ECC/CRC bits for the second element. Successive elements of frame 84 are generated in a like manner.

Frame 84 then ends with an eighteenth element comprising the 16-bits of field 97. No ECC/CRC bits are calculated for this last 16 bit field.

Frame 84 is transmitted by the adaptive digital service unit 72 to adaptive office control unit 78 on subscriber loop 82. The speed at which data is sent on subscriber loops 80 and 82, referred to as the loop speed, depends on the data rate between computer 70 and adaptive digital service unit 72 as well as the communication protocol being used, i.e., framed or unframed. The relationship between the loop speed and the data rate in the preferred embodiment of the present invention is shown in Table I.

The loop speed, i.e., the speed of data rate transmission over the subscriber loops, is higher than the data rate at which the customer's digital processing equipment transmits data to the adaptive digital service unit, because of the additional data added to the customer's data. The preferred network provides data transmission at data rates typically ranging between 1.2 and 64 Kbits/sec. For example, the data rates provided in a practical embodiment include 1.2, 2.4, 4.8, 9.6, 19.2, 32, and 38.4 Kbits/sec in the frame mode. A data rate of 64 Kbits/sec is supported in the unframed mode described below.

As noted above, the number of user data bits which are inserted into frame 84 by adaptive digital service unit 72 depends on the data rate and on whether or not the adaptive digital service unit is running in a synchronous or asynchronous mode. The number of user data bits so inserted in the synchronous mode is also shown in Table I. The asynchronous data mode will be discussed in more detail below. At those data rates for which less than 378 bits are accumulated, the remaining bits of field 96 are loaded with ones. At a data rate of 1.2 Kbits/sec, the remaining 192 bits may be filled with a copy of the 192 bits accumulated from computer 70 instead of ones. This second copy of the user's data provides an additional error correcting capability.

Adaptive office control unit 78 transforms frame 84 into a format which is compatible with a $T_1$ communication link within the telephone system. The $T_1$ communication links in the telephone system consist of two communication paths. The first path 98 is used to transmit data and the second path 99 is used to receive data. Data is transmitted on these paths in 24 time domain multiplexed channels. Each channel operates at a fixed rate of 64 Kbits/sec. The data is communicated in 24-byte $T_1$ frames, one byte of each frame corresponding to each time channel. Typical frames are shown in FIG. 3 at 101 and 103.

The interface between the individual channels and the $T_1$ communication links is accomplished by a conventional channel bank 100 which includes 24 "slots" 102. Each slot provides a means for sending data to and receiving data from a specified $T_1$ channel. In the preferred embodiment of a computer network utilizing the present invention, two of these slots are utilized by each adaptive office control unit for transmitting frame 84. However, as will be explained in detail below, if a user wishes to purchase only a subset of the error correcting features of the telephone system computer network, only one of these slots is made available. To simplify the following discussion, it will be assumed that only one of these channels is utilized unless otherwise specified.

At a loop speed of 56 Kbits/sec, adaptive office control unit 78 copies frame 84 into the first of these reserved $T_1$ channels by copying successive 7-bit segments of said frame on the $T_1$ channel during the time period reserved for the $T_1$ channel in question. Each 7-bit segment is augmented by adding one "1" bit to form an 8-bit byte. This byte is then copied to the $T_1$ channel. Two successive types created by adaptive office control unit 78 are shown at 105 and 106 respectively. The "d" indicates a data bit and the "1" indicates the inserted one bit. Bytes 105 and 106 are copied to the $T_1$ channels shown at 107 and 108 respectively.

The added one bit assures that there is sufficient density of ones on the $T_1$ communication link to maintain the synchronization of the $T_1$ system. $T_1$ communication links are used to transmit data over long distances. Hence, they must utilize one or more repeaters. These repeaters must by synchronized to assure the overall synchrony of the $T_1$ system. The repeaters in question utilize transitions between "1" and "0" bits to maintain synchrony. As a result, long sequences of "0" bits are to be avoided. By adding one "1" per byte, each office control unit assures that the minimum density of "1" bits is always present. As noted above, the data rate of a $T_1$ channel is 64 Kbits/sec. The added "1" bit transmitted with each 7 bits of frame data brings the 56 Kbits/sec loop speed up to 64 Kbits/sec which exactly matches the capacity of a $T_1$ channel.

When the loop speed is less than 56 Kbits/sec, i.e., 28 Kbits/sec, 14 Kbits/sec, 7 Kbits/sec or 3.5 Kbits/sec, the $T_1$ channel is capable of transmitting more data then the telephone system computer network is receiving. IN a computer network utilizing the present invention, this added capacity may be utilized for error correction by repetitively transmitting each data byte. The additional copies of the byte are transmitted in successive $T_1$ frames immediately after the $T_1$ frame containing the first copy. When the loop speed is 14 Kbits/sec, each byte is transmitted four times in successive $T_1$ frames, and so on.

Adaptive office channel unit 78 also receives data from the $T_1$ control connected thereto on line 99. When two copies of the transmitted byte are received by an adaptive office control unit 78, the unit checks for errors by noting disagreement between the type bytes, and one of the bytes is selected for output. If the number of copies of each byte is greater than two, an adaptive office control unit 84 receiving the data on the $T_1$ channel can correct for some errors that occur on a channel level, i.e., during transmission of the bytes between network units which communicate on the $T_1$ communication links. Such network units utilize conventional majority decision algorithms in addition to detecting and reporting errors. If only two copies of the transmitted bytes are present, and the copies are not identical, the receiving adaptive office control unit 78 only notes an error. As will be explained below, such error information may be accessed from the adaptive digital service units to aid in diagnosing system failures and taking corrective measures.

When "$T_1$ formatted" data bytes are received in an adaptive office control unit, the added "1" bit is stripped and the original frame is reconstructed. This frame is transmitted to adaptive digital service unit 72 on subscriber loop 80. Those errors which may be corrected using the above mentioned majority decision algorithm are corrected; however, no attempt is made to correct errors in user data utilizing the 5 error correcting bits included in each element 73. Rather, errors which may be so corrected are corrected by adaptive digital service unit 72 when it receives the frame.

Upon receiving the frame, adaptive digital service unit 72 unpacks the frame elements 73 and corrects for any errors which can be corrected using the 5 error correcting bits. Adaptive digital service unit 72 then separates the user data from the command data. The user data is then transmitted to computer 70 on serial communication link 74. Any commands intended for adaptive digital service unit 72 are executing by adaptive digital service unit 72.

The adaptive digital service unit which is connected to the master computer in the user's computer network will be referred to herein as the master adaptive digital service unit. The adaptive digital service units connected to the slave computers in the user's computer network will be referred to as the slave adaptive digital service units. If a slave adaptive digital service unit notes errors, it keeps track of these errors. If the error rate exceeds a predetermined threshold value, the slave adaptive digital service unit in question reports an error condition to the master adaptive digital service unit using one of the commands transmitted in field 92 of the loop frame.

If the adaptive digital service unit is a master adaptive digital service unit, it may send commands to the process and control circuits in the telephone system computer network which cause the speed of the computer network to be reduced. These commands are also sent in field 92. By reducing the speed of the telephone system computer network, error rates may be significantly reduced for two reasons. First, reducing the speed at which subscriber loops 80 and 82 operate substantially reduces the error rates on these communication links. Second, as noted above, majority decision algorithms may be used to correct $T_1$ channel-level errors on the $T_1$ communication links at lower data rates.

As noted above, the present invention also supports a communication mode in which user data is transmitted at 64 Kbits/sec. Such high speed data transfer capabilities are increasingly sought in order to implement high speed computer networks. Since the effective bandwidth of subscriber loops 80 and 82 does not permit data transfer at rates greater than 72 Kbits/sec, there is insufficient bandwidth to permit data transfer using the loop frame format described above. As a result, error checking and correction on the subscriber loop links is not available in this communication mode. Error detection and correction may be, however, provided on the data paths utilizing $T_1$ communication links.

When operating in the unframed format, 64 Kbits/sec communication mode, adaptive digital service unit 72 receives 8-bit data bytes from computer 70 and transmits data in 9-bit words on subscriber loop 82. Each 9-bit word consists of the 8 bits transmitted by computer 70 and a "1". The added "1" is utilized for maintaining synchrony on subscriber loops 80 and 82. Upon receipt by adaptive office channel unit 78, the added "1" is stripped, and the 8 bit data byte is then, preferably transmitted sing an error correcting code to correct for transmission errors on the $T_1$ communication links.

As noted above, the $T_1$ communication links were originally designed for carrying voice quality data. As a result, the transmission error rates over these communication links are often too great to allow satisfactory transmission of computer data. To reduce the effective error rates on the $T_1$ communication links, both of the $T_1$ channels mentioned above are utilized together with an error correcting code. At lower transmission speeds, such error correction is not so critical, since the insertion of error codes and error correction utilizing these codes are performed by the adaptive digital service units. However, additional error correction may still be desirable. At the 64 Kbits/sec data rate, these adaptive digital service unit functions are not available; hence, this added error correction is almost always needed.

Conventional error correcting codes are well known in the computer and telephone arts. Hence, these codes will not be discussed in detail here. For the purposes of this discussion, an error correcting code will be defined as a transformation of a D-bit data word to an encrypted Q-bit data word where $Q>D$ and wherein the transformation which decrypts the Q-bit encrypted data word corrects for errors resulting from alterations resulting from as many as N bits being picked or dropped in transmission over the $T_1$ communication links. Here, N is a function of the particular code chosen. In general, codes having higher ratios of Q to D have higher N values.

In the present invention, D is preferably equal to 8; Q must be greater than 8. As noted above, a single $T_1$ channel provides a 64 Kbits/sec data communication facility. Since the user data is arriving at adaptive office control unit 78 at 64 Kbits/sec in the unframed mode, and since more than 8 bits must be sent for each 8 bits received, it follows that more than one $T_1$ channel must be utilized. As noted above, each adaptive office control unit 78 is connected to two slots in the $T_1$ channel bank. The above discussion assumed that only one of these slots is utilized. When additional error correction on the $T_1$ communication links is desired, e.g., at the 64 Kbits/sec data rate, both slots are utilized. Since two $T_1$ channels are utilized, the optimum value for Q is 16. Hence, the present invention utilizes a 16-bit error correcting code. That is, each 8-bit user data word is encrypted to form a 16-bit encrypted word which is then divided into two 8-bit transmission words, one such transmission word being transmitted over each of the two $T_1$ channels coupled to adaptive office control unit 78.

Similarly, adaptive office control unit 78 receives two data words from the incoming channels of the channel bank and converts those two words to a 16-bit encrypted word which is then decrypted to form an 8-bit data word which is used to generate the data transmitted on subscriber loop 80. If the computer network is operating in the frame mode, the added one is stripped from the 8-bit data word. If the computer network is operated in the unframed mode, a "1" is added.

In addition to the properties mentioned above, the error correcting code used for correcting errors on the $T_1$ communication links preferably includes one additional property. As noted above, the $T_1$ communication links include repeaters which enable the signals thereon to be transmitted over long distances. These repeaters must remain synchronized. The synchronization is accomplished by observing transitions between "1" and "0" bits on the communication links. Hence, a minimum density of "1" bits is needed. At lower transmission rates, this density was provided by sending 7 data bits and a "1" in each $T_1$ channel. At 64 Kbits/sec, this solution is not possible, since there is insufficient bandwidth on the $T_1$ lines to transmit the additional "1". As a result, the preferred error correcting code is one which guarantees that each of the 8-bit transmission words has at least one "1".

The preferred error correcting code used in the adaptive multijunction differs from conventional error correcting codes which do not provide at least one "1" in each 8-bit transmission word. In conventional error correcting codes at least one of the transmission words is 0 for some value of the 8-bit user data word. As a result, conventional error correcting codes are unsatisfactory for use in the 64 Kbits/sec mode of a computer network according to the present invention. The preferred error correcting code is, however, derived from a conventional error correcting code by a transformation which is easily implemented in electronic circuitry and which preserves the full error correcting capability of the conventional error correcting code.

When the $T_1$ error correcting features is operative, an 8-bit data word which is to be sent over a $T_1$ communication link is encrypted as follows. First, the 8-bit user data word is encrypted with a conventional cyclic error correcting code shown in Table II to form two encrypted 8-bit words $^1X$ and $^2X$. The error correcting code shown in Table II is a conventional (16, 8) BCH code in which the 16-bit encrypted data word has been broken into two 8-bit data words.

The adaptive office control unit transmits two transmission data words $^1Y$ and $^2Y$ in place of $^1Y$ and $^2X$. $^1Y$ and $^2Y$ are derived from $^1X$ and $^2X$ by performing a transformation of $^1X$ and $^2X$ to arrive at $^1Y$ and $^2Y$. The transformation in question operates by exchanging the data in various bit positions and by complementing the data in specified bit positions prior to said data being exchanged. This is illustrated in Table II by the labels over the various bit positions in $^1X$, $^2X$, $^1Y$, and $^2Y$. The bit positions in $^1X$ are labeled "1" through "8". The bit positions in $^2X$ are labeled "A" through "H". The data used to generate $^1Y$ and $^2Y$ is shown over the columns labeled $^1Y$ and $^2Y$. For example, the first bit of $^1Y$ is obtained by copying the data in the first bit position of $^1X$. The second bit of $^1Y$ is obtained by copying the data in the second bit position of $^1X$. And, the eighth bit of $^1Y$ is obtained by copying the data in the seventh bit position of $^2X$ and complementing said data, as indicated by the bar over the letter G.

This method for generating the transmission words, $^1Y$ and $^2Y$, is preferred because conventional circuitry for generating $^1X$ and $^2X$ from a user data word x using a BCH code is inexpensive and readily available. The above described transformation is also easily implemented since it can be carried out by placing $^1X$ and $^2X$ in a first set of registers and then copying the data to a second set of registers and then connecting the corresponding bit positions by conducting paths. For those bit positions in which the data is to be complemented, inverters are placed in the conducting paths in questions.

Similarly, the decryption process may advantageously utilize conventional circuitry for decrypting the BCH code in question. The transmission data words are placed in a first set of registers. The data in these registers is then copied into a second set of registers by connecting corresponding bit positions by conducting paths which include inverters in selected paths. The data in the second set of registers is then decrypted using the conventional BCH hardware.

It should be noted that the transformation in question begins and ends with the conventional BCH code. Hence, it has the same error detecting and correcting capabilities as the conventional code.

Having provided the above discussion of the basic elements of a computer network adapted for utilizing an adaptive digital service unit according to the present invention, a more detailed description of such an adaptive digital service unit will now be given.

Figure 4:
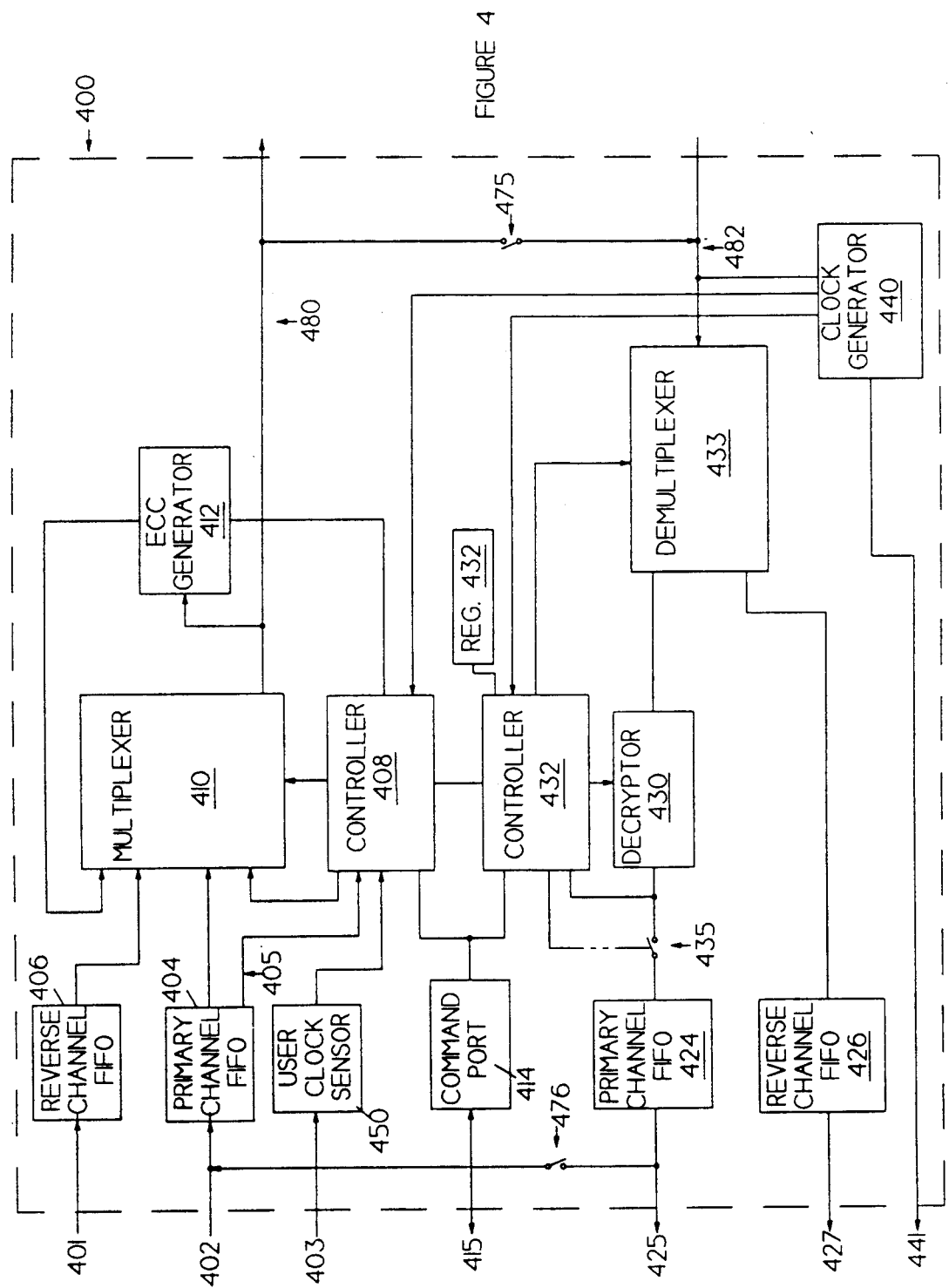
FIG. 4 is a block diagram of an adaptive digital service unit according to the present invention.

FIG. 4 is a more detailed block diagram of an adaptive digital service unit 400 according to the present invention. Adaptive digital service unit 400 provides full duplex transmission on a primary channel and also on a low speed reverse channel. Adaptive digital service unit 400 is adapted for connection to two subscriber loops 480 and 482 which are used for transmitting and receiving data, respectively. Adaptive digital service unit 400 is controlled by two controllers 408 and 432 which are preferably microprocessors. Controller 408 supervises the transmission of data on subscriber loop 480, and controller 432 supervises the reception of data on subscriber loop 482. Controllers 408 and 432 are connected together so that those functions which require coordination between the controllers may be more efficiently carried out. In addition, controllers 408 and 432 are connected to a command port 414 which is used for inserting commands into frames transmitted by adaptive digital service unit 400 and for viewing data contained in the frames received by adaptive digital service unit 400. Command port 414 may be accessed by connecting a network control computer to bus 415.

User data which is to be transmitted in the reverse channel is inputted on signal line 401 into a reverse channel FIFO buffer 406. Similarly, the user data which is to be transmitted in the primary channel is inputted to a primary channel FIFO buffer 404 on signal line 402.

An optional user clock input is provided on signal line 403 which is utilized in the asynchronous mode which will be described in more detail below. When running in the asynchronous mode, the adaptive digital service unit which is connected to the master computer senses the user clock rate using a clock sensing circuit 450. The master adaptive digital service unit sets the frame transmission rate for the network in response to this clock rate, provided the observed error rates in the telephone system computer network are acceptable at this rate.

In the synchronous transmission modes, adaptive digital service unit 400 provides the clock signals for the user's computers on bus 441. These clock signals are derived from the data transmitted on subscriber loop 482 by a clock generator 440. Clock generator 440 also generates the interrupt signals used by controllers 408 and 432 to synchronize their operations with those of other network units in the telephone system computer network.

Upon receiving an interrupt from clock generator 440 which indicates that a new frame is to be generated and transmitted on subscriber loop 480, controller 408 generates the frame in question with the aid of multiplexer 410 and error correction code generator 412. As noted above, each frame is composed of 17 32-bit elements shown in FIG. 3 at 73 and a 16-bit block shown in FIG. 3 at 75. Each element consists of four fields. Fields 73a and 73c are data fields which contain data which is overhead data, i.e., the Barker code, command data, address data, etc., or user data. The overhead data is generated by controller 408 and placed on an input line of multiplexer 410. The user data is copied from FIFO buffer 404 to a second input line of multiplexer 410.

The remaining fields of each element are the "1" used to maintain synchrony on subscriber loop 480 and the 5 ECC/CRC bits which are calculated from the data in fields 73a and 73c. An element 73 is generated as follows First, the 16 bits which are to become field 73a are shifted onto subscriber loop 480 by coupling the appropriate input line of multiplexer 410 to subscriber loop 480. These 16 bits are also shifted into ECC generator 412. Next, the "1" bit is copied to subscriber loop 480 through multiplexer 410; however, this bit is not shifted into ECC generator 412. The "1" bit may be generated by controller 408 or by connecting one of the input lines of multiplexer 410 to the appropriate signal voltage. Next, the 10 bits which are to become field 73c are copied onto subscriber loop 480 in a manner similar to that described above with respect to field 73a. These bits are also shifted into ECC generator 412.

Finally, ECC generator 412 which is preferably a shift register which generates one of the 5 ECC bits each time it is shifted is activated. Its output is connected to one of the inputs of multiplexer 410. ECC generator 412 is then shifted 5 times while multiplexer 410 places the 5 ECC bits onto subscriber loop 480.

Successive elements 73 are generated in a like manner under the control of controller 408. After all of the elements 73 have been generated, the 16 bits of block 75 are placed on subscriber loop 480 by connecting FIFO buffer 406 to subscriber loop 480 through multiplexer 410. It should be noted that FIFO buffers 404 and 406 are under the control of controller 408. The control connections to these buffers have been omitted to improve the clarity of the drawing.

The command and address data inserted into a frame generated by controller 408 may come from command port 414 or from controller 432. In the latter case, the commands will be in response to a command received by controller 432 in a previously received frame. In addition, controller 408 generates commands in response to detected changes in the user data rate which are sensed by sensor 450.

When operating in the 64 Kbits/sec mode described above, controller 408 merely shifts successive 8-bit data words from FIFO 404 onto subscriber loop 480 through multiplexer 410. After each 8-bits group has been shifted, multiplexer 410 is used to insert the 9th bit which is a "1". The circuitry for inserting this 9th bit is the same as that used for inserting the "1" in field 73c.

A frame is received on subscriber loop 482 in a similar manner under the control of controller 432. The data on subscriber loop 482 are coupled to a demultiplexer 433. Each of the 17 elements 73 is routed in turn to a decryptor 430 which checks the element for transmission errors using the 5 ECC/CRC bits contained in field 73d of the element. If an error is detected, an attempt is made to correct the error using the error correcting code. Each error is noted by controller 432. This error information is used to control the data transmission rate of the telephone system computer network and is also available to the user through command port 414.

Controller 432 reads the corrected elements as they leave decryptor 430. Those elements which contain overhead information are blocked from entering the primary channel FIFO buffer 424 used to feed user data to the user's computer. Switch 435 which is under the control of controller 432 is used for this purpose. After all of the elements have been received, the 16-bit block 75 of the received frame is routed to reverse channel FIFO buffer 426 by demultiplexer 433.

As noted above, when operating in the synchronous data mode, the user's computer receives clock signals from the adaptive digital service unit. Hence, the rate at which the user provides data to the adaptive digital service unit is matched to the rate at which the adaptive digital service unit transmits data on subscriber loop 480. The present invention also supports an asynchronous data mode in which the user transmits data at a rate determined by a clock in the user's computers. When such an asynchronous communication protocol is utilized, such synchrony can not be guaranteed, since the user's computer utilizes its internal clock which may differ in speed by as much as 2% from the telephone system clock. If the computer clock is slower than the telephone system clock, insufficient data will have accumulated in adaptive digital service unit 400 to fill a frame when the time for frame transmission occurs. If the computer clock is faster than the telephone system clock, more data will accumulate in adaptive digital service unit 400 than can be transmitted in the next frame. In this latter case, an overflow condition will eventually occur.

To accommodate differences in clock speeds, adaptive digital service unit 400 utilizes a slightly different communication protocol in the asynchronous communication mode. As noted above, loop frame 90 includes field 96 which has space for 384 user data bits. In addition, it contains an 8-bit field 94. In the asynchronous communication mode, user data is transmitted either in the first 376 bits of field 96 or in all 384 bits thereof plus the 8 bits of field 94. In this latter case, each frame accommodates 392 user data bits.

The specific format utilized in any given loop frame is specified by the value of one of the bits in field 95 and determined by the state of FIFO buffer 404 mentioned above. If FIFO buffer 404 is less than half full when the time occurs for a frame 84 to be constructed, the 376 user data bit mode is used. If FIFO buffer 404 is more than half full, the 392 user data bit format is utilized. The state of FIFO buffer 404 is sensed on an output line 405 of the buffer.

This aspect of the present invention effectively allows the present invention to match the data rate of the user's computer. When the user's computer is operating at the minimum acceptable data rate, all of the frames 84 have 376 bits of user data. When the user's computer is operating at the maximum acceptable data rate, all of the frames 84 have 392 bits of user data. At intermediate speeds, there is a mix of the two types of frames. The ratio of the number of frames in each format depends on the exact speed of the user's computer.

Another advantageous feature of the present invention is its ability to automatically reduce the data transmission rates when error rates exceeding a predetermined threshold are encountered. As noted above, the error rates in the system may be dramatically reduced by reducing the network speed. When the network is set up, the maximum acceptable error rate is programmed. This error threshold is programmed by sending commands through the system control port of an adaptive digital service unit, adaptive office control unit, or adaptive multijunction unit. Different error threshold values may be sent to different adaptive digital service units in the computer network if different error tolerances are present in the particular computer network implemented with the present invention.

When the computer network which includes the present invention is operating in the adaptive mode, an adaptive digital service unit, upon encountering an error rate above a programmed threshold, sends a signal to the adaptive digital service unit connected to the master computer the next time the adaptive digital service unit observing said error rate is used to communicate data to the master computer. Upon receiving this signal, the adaptive digital service unit connected to the master computer sends commands to the adaptive digital service units, adaptive office control units, and adaptive multijunction units in the telephone system computer network. These commands cause these devices to lower the data rates in the telephone system computer network. When the condition leading to the high error rates subsides, as evidenced by low observed error rates in the system, the adaptive digital service unit connected to the master computer sends commands instructing these devices to increase the data rates.

When operating in a non-adaptive mode, the various process and control circuits in the telephone system computer network merely report error rates to the adaptive digital service unit connected to the master computer. This information is available through the command port on the adaptive digital service unit connected to the master computer. The error rates observed by the adaptive digital service unit connected to the slave computers may also be accessed through the command ports of the adaptive digital service units in question.

As will be discussed in more detail below, the present invention includes provisions for setting loopbacks for use in diagnosing network malfunctions. Switches 475 and 476 shown in FIG. 4 which are also under the control of controller 432 are utilized to set these loopbacks. When closed, switch 475 causes all data outputted to subscriber loop 480 to be copied onto subscriber loop 482. Switch 476 operates in a like manner.

Another feature supported by an adaptive digital service unit according to the present invention reduces errors which arise from transmission errors on a communication link connecting a non-selected slave computer to the master computer. As noted above, only one of the slave computers is selected to communicate on the primary channel at any given time. The remaining slave computers communicate data frames which have nulls in the data fields normally used for sending command or user data. The multijunction units (e.g., multijunction unit 69 shown in FIG. 2) combine the data streams from the various slave computers to produce a single data stream.

The combining functions of a multijunction unit in a computer network have the potential for introducing transmission errors into the data stream sent to the master computer. For example, consider the case in which noise is present on the subscriber loops connecting the various slave computers to the adaptive office control units connected thereto. This noise will introduce errors into the various frames from the inactive computers thereby converting frames which should contain all nulls into frames which contain non-null bits in critical locations. When such erroneous data streams from the inactive computers are combined with the data stream from the active computer, the resultant data stream will include the transmission errors from the inactive computers. This problem increases in severity as the number of slave computers in the computer network increases, since the probability of a transmission error in at least one of the non-selected data links increases with number of such data links.

In this regard, it should be noted that the number of slave computers in the computer network may be much larger than the number of slave data ports on a single adaptive multijunction unit. In large computer systems, a number of adaptive multijunction units may be cascaded. That is, the output of the master data port of one adaptive multijunction unit may be connected to the input of a slave data port in another adaptive multijunction unit.

The preferred embodiment of the present invention utilizes two commands, referred to ACTIVATE AND DEACTIVATE, to substantially reduce such errors. As noted above, the user's computer equipment is connected to an adaptive digital service unit via a standard RS-232 interface. The adaptive digital service unit tracks the on and off states of the CTS signal from the user's computing equipment. When the CTS is turned off (no data to send), the adaptive digital service unit sends a frame with all nulls for the user data and a DEACTIVATE command in the command portion of the frame. When the CTS is turned on, the adaptive digital service unit sends a frame with an ACTIVATE command in the command portion of the frame.

When a slave port of an adaptive multijunction unit designed to work with the present invention receives a DEACTIVATE command, it places all nulls on its internal signal bus for the slave port in question. Furthermore, if the master port in the adaptive multijunction unit detects that all slave ports are so deactivated, it constructs an outgoing frame which also consists of all nulls and a DEACTIVATE command. Hence, for noise to get through an adaptive multijunction unit in normal synchronization mode, it must duplicate an ACTIVATE command which is highly unlikely.

As noted above, the adaptive digital service units, adaptive office control units, and adaptive multijunction units are all capable of executing a number of commands that are useful in setting the data transmission mode and data transmission rate, and in diagnosing errors in the computer network. By utilizing these commands, the computer network user can control key features of the network and can diagnose problems without the intervention of telephone company personnel. By restricting the commands that may be executed by the computer network user, the telephone company can restrict the user to prearranged data rates and services. This provides the telephone company with the ability to market more restrictive network capabilities at lower user rates. The manner in which system commands are restricted will be described in more detail below.

When operating in the framed mode, an adaptive digital service unit according to the present invention unpacks the data in a frame 84 received thereby by detecting the beginning of the frame using the synchronization data described with reference to field 91 of loop frame 90. The frame is unpacked by controller 432 shown in FIG. 4. Controller 432 extracts the command and address data. Some of the commands utilize other data fields of loop frame 90 to communicate further data needed by the command. If the command in question utilizes this additional data, the data in the fields in question is also extracted. Some of these commands may not be given when the user is transmitting data on the computer network, since the commands utilize the fields reserved for user data.

Controller 432 includes a register 434 for storing an address identifying the adaptive digital service unit in question. When a command is received, controller 432 checks the address specified in the received frame 84 to determine if the command is to be executed by the adaptive digital service unit in question.

Controller 408 also generates command data in response to a received command by controller 432. This data is inserted in the command data fields in the next frame transmitted by controller 408. As noted above, the adaptive digital service unit also includes a command port which provides a means for telephone service technicians or the user to insert commands in the telephone system computer network.

A number of commands executed by the adaptive digital service unit and their functions will now be described.

Secure commands

A computer network utilizing the present invention preferably includes a security mechanism to insure that network commands that originated from an adaptive digital service unit are restricted such that a user cannot use an option that is not subscribed or change the network configuration in a manner which might introduce problems into the telephone system. The mechanism in question utilizes the first bit in field 95 which is referred to as the security bit. When this bit is a "1", the adaptive office control units and adaptive multijunction units are restricted from executing the commands specified in field 92 of the loop frame. To assure that a user can not set the security bit to a "0", the adaptive office control units force this bit to a "1" when the adaptive digital service unit blocked data is passed through an adaptive office control unit. Secure commands, i.e., those which require a security bit of "0", can only be sent from internal devices (adaptive office control units and adaptive multijunction units) in the telephone system computer network. Whenever an internal device receives a command from its system control port, the device sets the security bit to "0" for the frame containing the command in question.

If an adaptive digital service unit inserts a secure command into a loop frame in response to commands on its system command port, the internal devices in the telephone system computer network will not execute the command, since even if the adaptive digital service unit changes the security bit to a "0", the adaptive office control unit receiving the loop frame information forces the security bit to a "1". However, an adaptive digital service unit receiving a secure command will execute the command, since adaptive digital service units do not check the security bit. Hence, the user can always check the observed data rates through the entire system, since this information is available from the far end adaptive digital service unit.

Examples of secure commands are commands that reset the internal devices in the telephone system, commands that enable the 64 kbits/sec transmission mode, and commands that enable a second group of commands that are referred to as conditionally secure commands. If a user wishes to utilize the conditionally secure commands, the user must do so by transmitting the request to the telephone company. A telephone system technician then issues a secure command that enables the commands in question.

Conditionally secure commands are commands that may be enabled for a given network by the telephone company. Once enabled, the user can use these commands. Such commands are useful for restricting service to computer networks that have subscribed to only part of the available computer network services. Examples of such commands are commands that read the status of various internal devices, e.g., adaptive office control units and adaptive multijunction units, commands that place the various internal devices in loopback modes for testing, and commands that reconfigure the adaptive multijunction units for testing purposes. This last group of commands will be discussed in more detail below.

Conditionally secure commands are implemented utilizing the above discussed security bit and a security flag in each network unit. Each network unit has a security flag consisting of a one-bit storage cell. There is one such flag for each feature that may be triggered by a conditionally secure command. If a network unit's security flag for a particular option is set to a "1", the network unit will ignore a conditionally secure command sent to it. If the security flag is a "0", the command will be executed. The security flags of the various network units are set and reset by a set of secure commands. Hence, when a user subscribes to a particular service such as user enabled testing, a secure command enabling the security flag in the relevant internal devices is sent by a telephone company technician.

Rules Governing the Execution of Network Commands

The various network units in a computer network, the adaptive digital service units, the adaptive multijunction unit, and the adaptive office control units, must remain synchronized for the computer network to operate correctly. To reduce the chance that erroneous commands will cause one or more to the devices to operate in a mode that will destroy this synchrony, the following three rules are observed. First, a network unit ignores all undefined or inappropriate commands. The network unit also ignores any command that might have been modified by a transmission error. If the 5 error correcting bits in the element 73 containing the command indicate that a transmission error has occurred during the transmission of said element, the command is ignored.

Second, the time at which a given command is executed is determined by the microprocessor present in the network unit. The ACTIVATE and DEACTIVATE commands must be executed as soon as possible after the command and address bytes are received. All other commands must wait until the complete frame is received before executing the commands.

Third, all network units, including the adaptive digital service unit of the present invention respond to a STATUS command with the address assigned to the unit and the status of unit. This command may be used to verify that a previously sent command was properly executed.

Initialization

Upon being powered up or reset, the adaptive digital service unit of the present invention assumes a default state in which data is transmitted and received in the framed data mode at a default data rate which is preferably 2.4 Kbits/sec. At this point, the adaptive digital service unit does not have an assigned address. The adaptive digital service unit may be assigned an address by a command from its command port or by receiving a frame which includes an ADDR_ASSIGN command and an address to be assigned.

Once the adaptive digital service unit has acquired an address in this manner, it ignores all other ADDR_ASSIGN commands. As noted above, each network unit, including the adaptive digital service unit, responds to a STATUS command by sending a frame which includes an ACK command and data specifying the unit's type (i.e., adaptive digital service), its address, and status. A STATUS command can be used to verify the address assignment.

The selection of the adaptive digital service unit which is to be the master adaptive digital service unit is made by a command, referred to as SET_MASTER, with the address of the adaptive digital service unit in question.

It should be noted that, with the exception of the RESET command, all the ADDR_ASSIGN and STATUS commands used can be executed from the command port of any device in the computer network. Hence, a user can ascertain the topology and addresses assigned within the computer network at any time, assuming that the user has been given access to this service, i.e., the security flags in the various devices have been appropriately set. Furthermore, the user can assign his own addresses to the network units within the telephone system computer network if the user so desires. This feature is particularly well suited to users who maintain their own network using software executed from an adaptive digital service unit within the network.

Data Rate changes

In the preferred embodiment of a computer network utilizing the present invention, there are three modes of operation for data rates within the telephone system computer network. These modes are controlled by two network commands, SET_RATE and SET_LIMIT. The manner in which each of these commands affects the telephone system computer network depends on whether the command is generated in an adaptive digital service unit by a customer or in an internal device by the network controller.

The first mode supported in the present invention is referred to as the fixed mode. In this mode, the data rates within the telephone system are fixed by the telephone company. The user can not modify the data rates in this mode.

The second mode is referred to as the selectable rate mode. In this mode, the user can select the data transmission rate up to a predetermined limit which is specified by the telephone company.

The third mode is referred to as the adaptive mode. In this mode, network units select the rate being used at any given time. The rate selected is controlled by the error rates observed within the telephone system computer network. Data rates of 1.2 Kbits/sec and 32 Kbits/sec are not supported in the adaptive mode, since these rates use the same internal data rates as the 2.4 kbits/sec and 38.4 Kbits/sec modes, respectively. If the telephone system computer network does not operate satisfactorily at 2.4 Kbits/sec, lowering the rate to 1.2 Kbits/sec will not improve the error rates. The same reasoning applies at 38.4 Kbits/sec. If unsatisfactory error rates are observed at 38.4 Kbits/sec, the rate must be lowered to 19.2 Kbits/sec.

If the user's computers are sending data at rates above the current data rate of the telephone system computer network, the adaptive digital service units will provide busy signals whenever data backs up. Alternatively, the user's computer can monitor the clock signals on bus 441 and adjust the user's data rate accordingly.

The user may purchase either a fixed mode service or an adaptive mode service. Having purchased the adaptive mode service, the user can switch between modes two and three as the user sees fit.

It should be noted that after a network unit has been reset by a RESET command or by being powered up, the device defaults to the fixed mode at a rate of 2.4 Kbits/sec.

A telephone system employee can establish a new fixed rate for a computer network by sending a SET_RATE command through the command port of any internal network unit in the telephone system computer network, i.e., an adaptive office control unit or an adaptive multijunction unit. The command will be relayed to the other network units in the telephone system computer network. Hence, it will reach an adaptive digital service unit according to the present invention on an incoming subscriber loop. Upon receiving the command, an adaptive digital service unit changes its internal hardware to transmit and receive at the new rate. At this stage, the network unit in question will lose synchronization. Synchronization will be re-established when the master adaptive digital service unit switches to the new data rate and the various network units receive data frames therefrom at the new rate.

A telephone system employee can enable the adaptive mode as follows. It is assumed that all network units within the telephone system computer network have been assigned an address and that all network units are operating at the same speed. The employee first sends a command specifying the error threshold. The command in question is referred to as SET_THRESHOLD and is preferably addressed to all devices in the computer network. The command also includes a threshold value which is preferably an integer specifying the error rate at which the telephone system computer network speed should be lowered. Upon receiving this command, an adaptive digital service unit stores the new error threshold value.

Once the new error rate has been set, the employee gives a SET_LIMIT command which is also addressed to all network units and which specifies the maximum rate at which data may be sent in the network. As noted above, this command is a secure command and must, therefore, be sent from an internal network unit in the telephone system computer network. The SET_LIMIT command is relayed throughout the network. All of the network units retain the new limit; however, none of the network units change their current rate unless the limit is lower than their current rate.

After the adaptive digital service units receive this command, they are free to adaptively change their rates according to the rules described below. Similarly, the customer can change back to a fixed rate at any time by giving the appropriate SET_RATE command. Similarly, the customer can resume the adaptive mode by giving a SET_LIMIT command.

Once the telephone system computer network is in the adaptive mode, the network can adaptively fall back to a lower operating speed. Each adaptive digital service unit tests for transmission errors using the error correcting bits contained in each element 73 described above. If any adaptive digital service unit detects an error rate greater than the error threshold programmed therein, action is taken to reduce the operating rate.

If the adaptive digital service unit in question is connected to a slave computer, it transmits a fall-back request to the adaptive digital service unit connected to the master computer. The adaptive digital service unit connected to the master computer will be referred to as the master adaptive digital service unit. The fall-back message is inserted into the command space of the next frame sent to the master computer from the adaptive digital service unit in question. The master adaptive digital service unit then causes the actual rate change by issuing a command instructing all devices to lower their speed to the next lower speed. As noted above, the telephone system computer network will never fall back to the 1.2 or 32 Kbits/sec rate, since these rates use the same loop formats and speeds as the 2.4 and 38.4 Kbits/sec rates, respectively.

In the preferred embodiment of the present invention, the criteria for the bit error rate to exceed the threshold uses the following algorithm. Initially, the adaptive digital service unit waits 15 seconds after a rate change before collecting bit error rate information. This provides sufficient time to assure that all of the internal devices in the telephone system computer network are now synchronized at the new rate. As noted above, when the telephone system computer network changes rate, the internal network units lose synchronization. Synchronization is recovered when these network units receive data frames from the master adaptive digital service unit at the new rate. During these times, user data is not accepted for transmission on the telephone system computer network, i.e., the adaptive digital service units signal the computers connected thereto that they are busy.

The adaptive digital service unit divides a time interval into one second intervals to compute an error rate. If any error is detected during a given one second interval, a count is added to an internal register. If the count in this internal register exceeds a predetermined threshold value at the close of the first time interval, the error threshold is deemed to have been exceeded. The predetermined threshold value and length of the time interval in question are set by a SET_THRESHOLD command which specifies one of a predetermined plurality of possible threshold value and time interval combinations. These values are preferably stored with the software in each of the controllers. Each combination corresponds to a different error rate.

If the master adaptive digital service unit detects an error rate above its threshold, it does not need to wait until the computer attached thereto sends data. In this case, the master adaptive digital service unit immediately transmits the new rate to the devices in the computer network.

A telephone system computer network utilizing an adaptive digital service unit according to the present invention can also increase its speed if low error rates are detected while operating in the adaptive mode. If any adaptive digital service unit other than the master adaptive digital service unit operates for a predetermined time interval without observing any errors, it will transmit a request to the master adaptive digital service unit to increase the network speed. The request is inserted in the next frame sent from the adaptive digital service unit in question. Upon receiving this request, the master computer stores an indicator to this effect. In addition, if the master adaptive digital service unit also receives error free data for the time interval in question, it stores an indicator to this effect. When the master adaptive digital service unit and at least one adaptive digital service unit connected to a slave computer have received error free data for the time interval in question, the master adaptive digital service unit sends a command to shift to the next higher data rate, provided such a data rate exists. This procedure is referred to as a "jumpup".

The time interval in question is set by a SET_THRESHOLD command which specifies one of a predetermined plurality of time interval settings.

The telephone system computer network will never jumpup to 38.4 or 64 Kbits/sec. As noted above, 32 and 38.4 Kbits/sec use the same loop format. Hence, if the network will run satisfactorily at 32 Kbits/sec it will also run satisfactorily at 38.4 Kbits/sec. The 64 Kbits/sec data rate is not supported in the adaptive mode because it uses a different data formatting technique.

To change the telephone system computer network to the 64 Kbits/sec mode, the user executes a conditionally secure command from an adaptive digital service unit in the computer network. This command is executed in a manner analogous to any other command. That is, the command, addressed to all devices, is placed in field 92 of the loop frame data.

To change from the 64 Kbits/sec mode to a lower rate, a command is also entered using the command port of a user adaptive digital service unit. However, since the data formats utilized in the 64 Kbits/sec mode are different from those utilized in the other modes, a different signaling format must be used. In this case, a specific sequence of bytes is placed in the data stream. Each network unit in the telephone system computer network scans for the sequence in question when the telephone system computer network is in the 64 Kbits/sec mode. Upon finding the sequence, the network unit in question returns to the lower data rate format at the default system transmission rate.

Synchronization

Since there are a number of possible operating speeds in the telephone system computer network, an adaptive digital service unit according to the present invention can determine the operating speed of the telephone system computer network and resynchronize with it. The problem of network units operating at different speeds can arise when a network unit receives a SET_RATE that is garbled by noise. Although this problem is primarily encountered when the telephone system computer network is operating in the adaptive mode, i.e., when the operating speed is being set in response to observed error rates, it can also occur in other modes, i.e., when a new adaptive digital service unit is plugged into the telephone system computer network while the computer network is operating at a fixed rate.

In a computer network utilizing the present invention, this problem is solved as follows. All network units, including the adaptive digital service unit, determine the system rate, i.e., the rate of the master adaptive digital service unit, and adjust themselves to that rate. When a network unit is out of synchronization for a predetermined period of time, it begins a scanning process to determine the system rate. The source of data which the network unit scans in its attempt to determine the system rate depends on the type of network unit and whether the network unit is coupled to the master computer in the computer network. If the device is an adaptive digital service unit coupled to a slave computer, it searches the incoming subscriber loop for the new rate until it resynchronizes using the algorithm described below.

An adaptive digital service unit detects that it does not know the system rate when it has failed to detect the Barker synchronization code which begins each frame in a predetermined number of bytes. When controller 432 shown in FIG. 4 has seen a sufficient number of data bytes to conclude that it should have seen the Barker code if the system speed was correct, it assumes that synchronization has been lost. The number of data bytes searched may differ for different data rates. Typically, this number is at least 3000 bytes in the preferred embodiment of the present invention.

Once the adaptive digital service unit detects that it does not know the system rate, it performs a search at the various possible system rates until it finds the Barker code at one of them. At each new rate, the adaptive digital service unit searches for the Barker code. After a predetermined number of bytes have been examined without finding the Barker code, the adaptive digital service unit selects the next lower speed and repeats the process. If it is already at the lowest speed, it selects 38.4 Kbits/sec for the next speed. Hence, the adaptive digital service unit will continue to cycle through all of the possible data rates until it finds the correct one.

Loopbacks

Each of the network units, including an adaptive digital service unit according to the preset invention, in the telephone system computer network includes loopback capabilities in the preferred embodiment of the present invention. When placed in loopback mode, data entering the adaptive digital service unit on the input subscriber loop is copied to the output subscriber loop. The point at which the data is transferred determines the type of loopback. In a "near" loopback, the data entering the adaptive digital service unit from subscriber loop 482 shown in FIG. 4 is copied back to subscriber loop 480 utilizing switch 475. That is, the data does not pass through the adaptive digital service unit. In a "far" loopback, the data is copied back at the point at which the data would normally leave the adaptive digital service unit, i.e., switch 476 would be used. By comparing the response of the adaptive digital service unit when near and far loopbacks are utilized, malfunctions within the adaptive digital service unit may be detected. Loopbacks are initiated and canceled by specific system commands similar to those described above.

Command Execution

Figure 5:
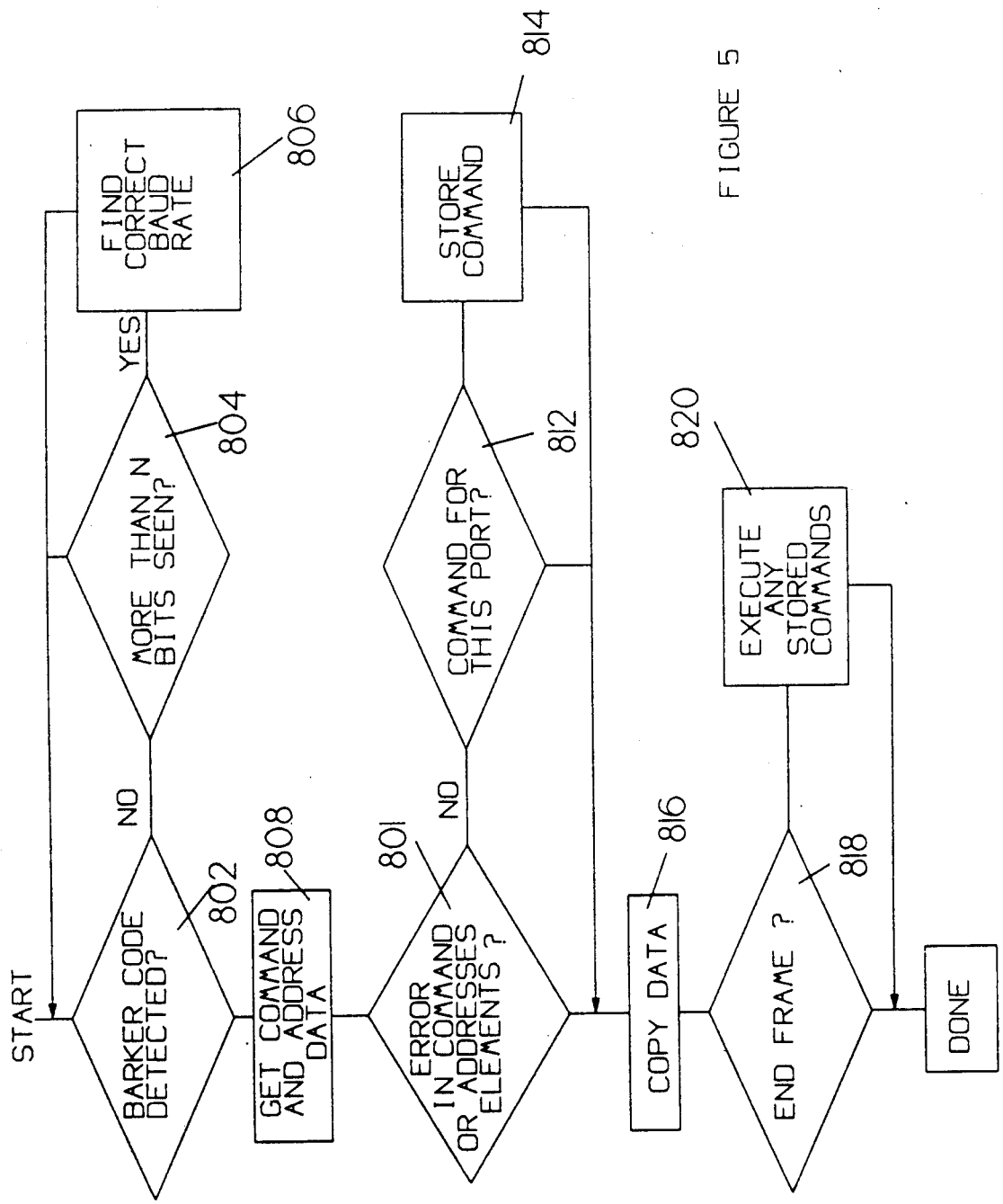
FIG. 5 is a flow chart of the command execution cycle of a controller utilized in the present invention.

Referring again to FIGS. 4 and 5, controller 432 scans the data stream arriving on subscriber loop 482 to determine if a command intended for the adaptive digital service unit in question is present. A flow chart of the command execution cycle of controller 432 is shown in FIG. 5. Controller 432 searches for the Barker synchronization code which begins each data frame as shown at 802. If more than N bytes are seen without finding the Barker code, the controller initiates a search for the correct system rate as discussed above and as shown at 804 and 806. When the Barker code is found, the controller extracts the command and address data as shown at 808. These data immediately follow the Barker code. The controller also examines the ECC bits in the frame elements containing the command and address data to determine if transmission errors have occurred as shown at 810. If no transmission errors have occurred, the controller compares the address in the command data with the address assigned to the adaptive digital service unit, as shown at 812. If the addresses match, the command is stored for execution at the end of the reception of the current frame as shown at 814. As noted above, the only commands which are immediately executed are the ACTIVATE and DEACTIVATE commands, which should never be received by an adaptive digital service unit. If such a command were erroneously received it would not be executed by the controller. If the command data included transmission errors, the command is ignored. When the controller sees the last byte of the frame, it executes any stored commands as shown at 818 and 820. If the command requires a response, e.g., a STATUS command which must be responded to with an ACK command, controller 432 signals controller 405 to provide the response in the next frame transmitted thereby.

Accordingly, an improved adaptive digital service unit has been described. While preferred embodiments of the invention have been illustrated and described above, there is no intent to limit the scope of the invention to these or any other specific embodiments. The scope of the invention is defined by the spirit and language of the appended claims.

TABLE I

| Data Rate (Kbits/sec) | Data Bits | Loop Speed (Kbits/sec) |
|---|---|---|
| 1.2 | 192 | 3.5 |
| 2.4 | 384 | 3.5 |
| 4.8 | 384 | 7.0 |
| 9.6 | 384 | 14.0 |
| 19.2 | 384 | 28.0 |
| 32.0 | 320 | 56.0 |
| 38.4 | 384 | 56.0 |

TABLE II

| DATA WORD X | 1x (1 2 3 4 5 6 7 8) | 2x (A B C D E F G H) | 1y (1 2 4 7 A B D G) | 2y (3 5 6 8 C E F H) |
|---|---|---|---|---|
| 0 | 0 0 0 0 0 0 0 0 | 0 0 0 0 0 0 0 0 | 0 0 0 0 0 0 1 1 | 0 0 0 0 0 0 1 1 |
| 1 | 1 0 0 0 0 0 0 0 | 1 0 0 1 1 1 0 0 | 1 0 0 0 1 0 0 1 | 0 0 0 0 0 1 0 1 |
| 2 | 0 1 0 0 0 0 0 0 | 0 1 0 0 1 1 1 0 | 0 1 0 0 0 1 1 0 | 0 0 0 0 0 1 0 1 |
| 3 | 1 1 0 0 0 0 0 0 | 1 1 0 1 0 0 1 0 | 1 1 0 0 1 1 0 0 | 0 0 0 0 0 0 1 1 |
| 4 | 0 0 1 0 0 0 0 0 | 0 0 1 0 0 1 1 1 | 0 0 0 0 0 0 1 0 | 1 0 0 0 1 0 0 0 |
| 5 | 1 0 1 0 0 0 0 0 | 1 0 1 1 1 0 1 1 | 1 0 0 0 1 0 0 1 | 1 0 0 0 1 1 1 0 |
| 6 | 0 1 1 0 0 0 0 0 | 0 1 1 0 1 0 0 1 | 0 1 0 0 0 1 1 1 | 1 0 0 0 1 1 1 0 |
| 7 | 1 1 1 0 0 0 0 0 | 1 1 1 1 0 1 0 1 | 1 1 0 0 1 1 0 1 | 1 0 0 0 1 0 0 0 |
| 8 | 0 0 0 1 0 0 0 0 | 1 0 0 0 1 1 1 1 | 0 0 1 0 1 0 0 0 | 0 0 0 0 0 1 0 0 |
| 9 | 1 0 0 1 0 0 0 0 | 0 0 0 1 0 0 1 1 | 1 0 1 0 0 0 0 0 | 0 0 0 0 0 0 1 0 |
| 10 | 0 1 0 1 0 0 0 0 | 1 1 0 0 0 0 0 1 | 0 1 1 0 1 1 1 1 | 0 0 0 0 0 0 1 0 |
| 11 | 1 1 0 1 0 0 0 0 | 0 1 0 1 1 1 0 1 | 1 1 1 0 0 1 0 1 | 0 0 0 0 0 1 0 0 |
| 12 | 0 0 1 1 0 0 0 0 | 1 0 1 0 1 0 0 0 | 0 0 0 1 0 1 1 1 | 1 0 0 0 1 1 1 1 |
| 13 | 1 0 1 1 0 0 0 0 | 0 0 1 1 0 1 0 0 | 1 0 0 1 0 0 1 1 | 1 0 0 0 1 0 0 1 |
| 14 | 0 1 1 1 0 0 0 0 | 1 1 1 0 0 1 1 0 | 0 1 0 1 1 1 0 1 | 1 0 0 0 1 0 0 1 |
| 15 | 1 1 1 1 0 0 0 0 | 0 1 1 1 1 0 1 0 | 1 1 1 0 0 1 0 1 | 1 0 0 0 1 1 1 1 |
| 16 | 0 0 0 0 1 0 0 0 | 1 1 0 1 1 0 1 1 | 0 0 0 0 1 1 0 0 | 0 1 0 0 0 1 1 0 |
| 17 | 1 0 0 0 1 0 0 0 | 0 1 0 0 0 1 1 1 | 1 0 0 0 1 1 0 0 | 1 0 0 0 0 0 0 0 |
| 18 | 0 1 0 0 1 0 0 0 | 1 0 0 1 0 1 0 1 | 0 1 0 0 1 0 0 1 | 0 1 0 0 0 0 0 0 |
| 19 | 1 1 0 0 1 0 0 0 | 0 0 0 0 1 0 0 1 | 1 1 0 0 0 0 1 1 | 1 0 0 0 0 1 1 0 |
| 20 | 0 0 1 0 1 0 0 0 | 1 1 1 1 1 1 0 0 | 0 0 0 0 1 1 0 1 | 1 1 0 0 1 1 0 1 |
| 21 | 1 0 1 0 1 0 0 0 | 0 1 1 0 0 0 0 0 | 1 0 0 0 0 1 1 1 | 1 1 0 0 1 0 1 1 |
| 22 | 0 1 1 0 1 0 0 0 | 1 0 1 1 0 0 1 0 | 0 1 0 0 1 0 0 0 | 1 1 0 0 1 0 1 1 |
| 23 | 1 1 1 0 1 0 0 0 | 0 0 1 0 1 1 1 0 | 1 1 0 0 0 0 1 0 | 1 1 0 0 1 1 0 1 |
| 24 | 0 0 0 1 1 0 0 0 | 0 1 0 1 0 1 0 0 | 0 0 1 0 0 1 0 1 | 0 1 0 0 0 0 0 1 |
| 25 | 1 0 0 1 1 0 0 0 | 1 1 0 0 1 0 0 0 | 1 0 1 0 1 1 1 0 | 1 0 0 0 0 1 1 1 |
| 26 | 0 1 0 1 1 0 0 0 | 0 0 0 1 1 0 1 0 | 0 1 1 0 0 0 0 0 | 1 0 0 0 1 1 1 1 |
| 27 | 1 1 0 1 1 0 0 0 | 1 . 0 0 0 0 1 1 0 | 1 1 1 0 1 0 1 0 | 1 0 0 0 0 0 0 1 |
| 28 | 0 0 1 1 1 0 0 0 | 0 1 1 1 0 0 1 1 | 0 0 0 1 0 0 1 0 | 0 1 1 0 0 1 0 1 0 |
| 29 | 1 0 1 1 1 0 0 0 | 1 1 1 0 1 1 1 1 | 1 0 1 1 1 1 0 1 | 1 0 0 1 1 0 0 |
| 30 | 0 1 1 1 1 0 0 0 | 0 0 1 1 1 1 0 1 | 0 1 1 0 0 0 1 1 | 1 0 0 1 1 0 0 |
| 31 | 1 1 1 1 1 0 0 0 | 1 0 1 0 0 0 0 1 | 1 1 1 0 1 0 1 1 | 1 1 0 0 1 0 1 0 |
| 32 | 0 0 0 0 0 1 0 0 | 1 1 1 1 0 0 0 1 | 0 0 0 0 1 1 0 1 | 1 0 0 1 0 1 1 0 |
| 33 | 1 0 0 0 0 1 0 0 | 0 1 1 0 1 1 0 1 | 1 0 0 0 1 1 1 0 | 0 1 0 1 1 0 0 |
| 34 | 0 1 0 0 0 1 0 0 | 1 0 1 1 1 1 1 1 | 0 1 0 0 1 0 0 0 | 0 0 1 0 1 1 0 0 |
| 35 | 1 1 0 0 0 1 0 0 | 0 0 1 0 0 0 1 1 | 1 1 0 0 0 1 0 0 | 0 0 1 0 1 0 1 0 |
| 36 | 0 0 1 0 0 1 0 0 | 1 1 0 1 0 1 0 0 | 0 0 0 0 1 1 0 0 | 1 0 1 0 0 0 0 1 |
| 37 | 1 0 1 0 0 1 0 0 | 0 1 0 0 1 0 1 0 | 1 0 0 0 0 -1 1 0 | 1 0 1 0 0 1 1 1 |
| 38 | 0 1 1 0 0 1 0 0 | 1 0 0 1 1 0 0 0 | 0 1 0 0 1 0 0 1 | 1 0 1 0 0 1 1 1 |
| 39 | 1 1 1 0 0 1 0 0 | 0 0 0 0 0 1 0 0 | 1 1 0 0 0 1 1 1 | 0 1 0 0 0 0 0 1 |
| 40 | 0 0 0 1 0 1 0 0 | 0 1 1 1 1 1 0 0 | 0 0 1 0 1 0 0 0 | 0 1 1 0 1 1 0 1 |
| 41 | 1 0 0 1 0 1 0 0 | 1 1 1 0 0 0 0 1 | 1 0 1 0 1 1 0 0 | 0 0 1 0 1 0 1 1 |
| 42 | 0 1 0 1 0 1 0 0 | 0 0 1 1 0 0 0 0 | 0 1 1 0 0 0 1 0 | 0 1 0 1 0 1 1 |
| 43 | 1 1 0 1 0 1 0 0 | 1 0 1 0 1 1 0 0 | 1 1 1 0 1 0 1 1 | 0 0 1 0 1 1 0 1 |

TABLE II-continued

| DATA WORD X | STANDARD ERROR CORRECTING CODE | | | | | | | | | | | | IMPROVED ERROR CORRECTING CODE | | | | | | | | | | | | | |
|---|---|---|---|---|---|---|---|---|---|---|---|---|---|---|---|---|---|---|---|---|---|---|---|---|---|---|
| | 1x | | | | | | | | 2x | | | | | | | | 1y | | | | | | | 2y | | | | | | | |
| | 1 2 3 4 5 6 7 8 | A | B | C | D | E | F | G | H | 1 | 2 | 4 | 7 | A | B | D | G | 3 | 5 | 6 | 8 | C | E | F | H |
| 44 | 00110100 | 0 | 1 | 0 | 1 | 1 | 0 | 0 | 1 | 0 | 1 | 0 | 0 | 1 | 0 | 1 | 1 | 0 | 1 | 0 | 0 | 1 | 1 | 0 |
| 45 | 10110100 | 1 | 1 | 0 | 0 | 0 | 1 | 0 | 1 | 1 | 0 | 1 | 0 | 1 | 1 | 1 | 1 | 0 | 1 | 0 | 0 | 0 | 0 | 0 |
| 46 | 01110100 | 0 | 0 | 0 | 1 | 0 | 1 | 1 | 1 | 0 | 1 | 1 | 0 | 0 | 0 | 0 | 1 | 0 | 1 | 0 | 0 | 0 | 0 | 0 |
| 47 | 11110100 | 1 | 0 | 0 | 0 | 1 | 0 | 1 | 1 | 1 | 1 | 1 | 0 | 1 | 0 | 1 | 1 | 0 | 1 | 0 | 0 | 1 | 1 | 0 |
| 48 | 00001100 | 0 | 0 | 1 | 0 | 1 | 0 | 1 | 0 | 0 | 0 | 0 | 0 | 0 | 0 | 1 | 0 | 0 | 1 | 1 | 0 | 1 | 1 | 1 | 1 |
| 49 | 10001100 | 1 | 0 | 1 | 1 | 0 | 1 | 1 | 0 | 1 | 0 | 0 | 0 | 1 | 0 | 0 | 0 | 0 | 1 | 1 | 0 | 1 | 0 | 0 | 1 |
| 50 | 01001100 | 0 | 1 | 1 | 0 | 0 | 1 | 0 | 0 | 0 | 1 | 0 | 0 | 1 | 1 | 1 | 0 | 1 | 1 | 0 | 1 | 0 | 0 | 1 |
| 51 | 11001100 | 1 | 1 | 1 | 1 | 1 | 0 | 0 | 0 | 1 | 1 | 0 | 0 | 1 | 1 | 0 | 1 | 0 | 1 | 1 | 0 | 1 | 1 | 1 | 1 |
| 52 | 00101100 | 0 | 0 | 0 | 0 | 1 | 1 | 0 | 1 | 0 | 0 | 0 | 0 | 0 | 0 | 1 | 1 | 1 | 1 | 1 | 0 | 0 | 1 | 0 | 0 |
| 53 | 10101100 | 1 | 0 | 0 | 1 | 0 | 0 | 0 | 1 | 1 | 0 | 0 | 0 | 1 | 0 | 0 | 1 | 1 | 1 | 1 | 0 | 0 | 0 | 1 | 0 |
| 54 | 01101100 | 0 | 1 | 0 | 0 | 0 | 0 | 1 | 1 | 0 | 1 | 0 | 0 | 0 | 1 | 1 | 0 | 1 | 1 | 1 | 0 | 0 | 0 | 1 | 0 |
| 55 | 11101100 | 1 | 1 | 0 | 1 | 1 | 1 | 1 | 1 | 1 | 1 | 0 | 0 | 1 | 1 | 0 | 0 | 1 | 1 | 1 | 0 | 0 | 1 | 0 | 0 |
| 56 | 00011100 | 1 | 0 | 1 | 0 | 0 | 1 | 0 | 1 | 0 | 0 | 1 | 0 | 1 | 0 | 1 | 1 | 0 | 1 | 1 | 0 | 1 | 0 | 0 | 0 |
| 57 | 10011100 | 0 | 0 | 1 | 1 | 1 | 0 | 0 | 1 | 1 | 0 | 1 | 0 | 0 | 0 | 0 | 1 | 0 | 1 | 1 | 0 | 1 | 1 | 1 | 0 |
| 58 | 01011100 | 1 | 1 | 1 | 0 | 1 | 0 | 1 | 1 | 0 | 1 | 1 | 0 | 1 | 1 | 1 | 0 | 1 | 1 | 1 | 0 | 1 | 1 | 1 | 0 |
| 59 | 11011100 | 0 | 1 | 1 | 1 | 0 | 1 | 1 | 1 | 1 | 1 | 1 | 0 | 0 | 1 | 0 | 0 | 0 | 1 | 1 | 0 | 1 | 0 | 0 | 0 |
| 60 | 00111100 | 1 | 0 | 0 | 0 | 0 | 0 | 1 | 0 | 0 | 0 | 1 | 0 | 1 | 0 | 1 | 0 | 1 | 1 | 1 | 0 | 0 | 0 | 1 | 1 |
| 61 | 10111100 | 0 | 0 | 0 | 1 | 1 | 1 | 1 | 0 | 1 | 0 | 1 | 0 | 0 | 0 | 0 | 0 | 1 | 1 | 1 | 0 | 0 | 1 | 0 | 1 |
| 62 | 01111100 | 1 | 1 | 0 | 0 | 1 | 1 | 0 | 0 | 0 | 1 | 1 | 0 | 1 | 1 | 1 | 1 | 1 | 1 | 1 | 0 | 0 | 1 | 0 | 1 |
| 63 | 11111100 | 0 | 1 | 0 | 1 | 0 | 0 | 0 | 0 | 1 | 1 | 1 | 0 | 0 | 1 | 0 | 1 | 1 | 1 | 1 | 0 | 0 | 0 | 1 | 1 |
| 64 | 00000010 | 1 | 1 | 1 | 0 | 0 | 1 | 0 | 0 | 0 | 0 | 0 | 1 | 1 | 1 | 1 | 1 | 0 | 0 | 0 | 0 | 1 | 0 | 0 | 1 |
| 65 | 10000010 | 0 | 1 | 1 | 1 | 1 | 0 | 0 | 0 | 1 | 0 | 0 | 1 | 0 | 1 | 0 | 1 | 0 | 0 | 0 | 0 | 1 | 1 | 1 | 1 |
| 66 | 01000010 | 1 | 0 | 1 | 0 | 1 | 0 | 1 | 0 | 0 | 1 | 0 | 1 | 1 | 0 | 1 | 0 | 0 | 0 | 0 | 0 | 1 | 1 | 1 | 1 |
| 67 | 11000010 | 0 | 0 | 1 | 1 | 0 | 1 | 1 | 0 | 1 | 1 | 0 | 1 | 0 | 0 | 0 | 0 | 0 | 0 | 0 | 0 | 1 | 0 | 0 | 1 |
| 68 | 00100010 | 1 | 1 | 0 | 0 | 0 | 0 | 1 | 1 | 0 | 0 | 0 | 1 | 1 | 1 | 1 | 0 | 1 | 0 | 0 | 0 | 0 | 0 | 1 | 0 |
| 69 | 10100010 | 0 | 1 | 0 | 1 | 1 | 1 | 1 | 1 | 1 | 0 | 0 | 1 | 0 | 1 | 0 | 0 | 1 | 0 | 0 | 0 | 0 | 1 | 0 | 0 |
| 70 | 01100010 | 1 | 0 | 0 | 0 | 1 | 1 | 0 | 1 | 0 | 1 | 0 | 1 | 1 | 0 | 1 | 1 | 1 | 0 | 0 | 0 | 0 | 1 | 0 | 0 |
| 71 | 11100010 | 0 | 0 | 0 | 1 | 0 | 0 | 0 | 1 | 1 | 1 | 0 | 1 | 0 | 0 | 0 | 1 | 1 | 0 | 0 | 0 | 0 | 0 | 1 | 0 |
| 72 | 00010010 | 0 | 1 | 1 | 0 | 1 | 0 | 1 | 1 | 0 | 0 | 1 | 1 | 0 | 1 | 1 | 0 | 0 | 0 | 0 | 0 | 1 | 1 | 1 | 0 |
| 73 | 10010010 | 1 | 1 | 1 | 1 | 0 | 1 | 1 | 1 | 1 | 0 | 1 | 1 | 1 | 1 | 0 | 0 | 0 | 0 | 0 | 0 | 1 | 0 | 0 | 0 |
| 74 | 01010010 | 0 | 0 | 1 | 0 | 0 | 1 | 0 | 1 | 0 | 1 | 1 | 1 | 0 | 0 | 1 | 1 | 0 | 0 | 0 | 0 | 1 | 0 | 0 | 0 |
| 75 | 11010010 | 1 | 0 | 1 | 1 | 1 | 0 | 0 | 1 | 1 | 1 | 1 | 1 | 1 | 0 | 0 | 1 | 0 | 0 | 0 | 0 | 1 | 1 | 1 | 0 |
| 76 | 00110010 | 0 | 1 | 0 | 0 | 1 | 1 | 0 | 0 | 0 | 0 | 1 | 1 | 0 | 1 | 1 | 1 | 1 | 0 | 0 | 0 | 0 | 1 | 0 | 1 |
| 77 | 10110010 | 1 | 1 | 0 | 1 | 0 | 0 | 0 | 0 | 1 | 0 | 1 | 1 | 1 | 1 | 0 | 1 | 1 | 0 | 0 | 0 | 0 | 0 | 1 | 1 |
| 78 | 01110010 | 0 | 0 | 0 | 0 | 0 | 0 | 1 | 0 | 0 | 1 | 1 | 1 | 0 | 0 | 1 | 0 | 1 | 0 | 0 | 0 | 0 | 0 | 1 | 1 |
| 79 | 11110010 | 1 | 0 | 0 | 1 | 1 | 1 | 1 | 0 | 1 | 1 | 1 | 1 | 1 | 0 | 0 | 0 | 1 | 0 | 0 | 0 | 0 | 1 | 0 | 1 |
| 80 | 00001010 | 0 | 0 | 1 | 1 | 1 | 1 | 1 | 1 | 0 | 0 | 0 | 1 | 0 | 0 | 0 | 0 | 0 | 1 | 0 | 0 | 1 | 1 | 0 | 0 |
| 81 | 10001010 | 1 | 0 | 1 | 0 | 0 | 0 | 1 | 1 | 1 | 0 | 0 | 1 | 1 | 0 | 1 | 0 | 0 | 1 | 0 | 0 | 1 | 0 | 1 | 0 |
| 82 | 01001010 | 0 | 1 | 1 | 1 | 0 | 0 | 0 | 1 | 0 | 1 | 0 | 1 | 0 | 1 | 0 | 1 | 0 | 1 | 0 | 0 | 1 | 0 | 1 | 0 |
| 83 | 11001010 | 1 | 1 | 1 | 0 | 1 | 1 | 0 | 1 | 1 | 1 | 0 | 1 | 1 | 1 | 1 | 1 | 0 | 1 | 0 | 0 | 1 | 1 | 0 | 0 |
| 84 | 00101010 | 0 | 0 | 0 | 1 | 1 | 0 | 0 | 0 | 0 | 0 | 0 | 1 | 0 | 0 | 1 | 0 | 1 | 1 | 0 | 0 | 0 | 1 | 1 | 1 |
| 85 | 10101010 | 1 | 0 | 0 | 0 | 0 | 1 | 0 | 0 | 1 | 0 | 0 | 1 | 1 | 0 | 1 | 1 | 1 | 1 | 0 | 0 | 0 | 0 | 0 | 1 |
| 86 | 01101010 | 0 | 1 | 0 | 1 | 0 | 1 | 1 | 0 | 0 | 1 | 0 | 1 | 0 | 1 | 0 | 0 | 1 | 1 | 0 | 0 | 0 | 0 | 0 | 1 |
| 87 | 11101010 | 1 | 1 | 0 | 0 | 1 | 0 | 1 | 0 | 1 | 1 | 0 | 1 | 1 | 1 | 1 | 0 | 1 | 1 | 0 | 0 | 0 | 1 | 1 | 1 |
| 88 | 00011010 | 1 | 0 | 1 | 1 | 0 | 0 | 0 | 0 | 0 | 0 | 1 | 1 | 0 | 0 | 0 | 1 | 0 | 1 | 0 | 0 | 1 | 0 | 1 | 1 |
| 89 | 10011010 | 0 | 0 | 1 | 0 | 1 | 1 | 0 | 0 | 1 | 0 | 1 | 1 | 0 | 0 | 1 | 1 | 0 | 1 | 0 | 0 | 1 | 1 | 0 | 1 |
| 90 | 01011010 | 1 | 1 | 1 | 1 | 1 | 1 | 1 | 0 | 0 | 1 | 1 | 1 | 1 | 1 | 0 | 0 | 0 | 1 | 0 | 0 | 1 | 1 | 0 | 1 |
| 91 | 11011010 | 0 | 1 | 1 | 0 | 0 | 0 | 0 | 1 | 1 | 1 | 1 | 1 | 0 | 1 | 1 | 0 | 0 | 1 | 0 | 0 | 1 | 0 | 1 | 1 |
| 92 | 00111010 | 1 | 0 | 0 | 1 | 0 | 1 | 1 | 1 | 0 | 0 | 1 | 1 | 1 | 0 | 0 | 0 | 1 | 1 | 0 | 0 | 0 | 0 | 0 | 0 |
| 93 | 10111010 | 0 | 0 | 0 | 0 | 1 | 0 | 1 | 1 | 1 | 0 | 1 | 1 | 0 | 0 | 1 | 0 | 1 | 1 | 0 | 0 | 0 | 1 | 1 | 0 |
| 94 | 01111010 | 1 | 1 | 0 | 1 | 1 | 0 | 0 | 1 | 0 | 1 | 1 | 1 | 1 | 1 | 0 | 1 | 1 | 1 | 0 | 0 | 0 | 1 | 1 | 0 |
| 95 | 11111010 | 0 | 1 | 0 | 0 | 0 | 1 | 0 | 1 | 1 | 1 | 1 | 1 | 0 | 1 | 1 | 1 | 1 | 1 | 0 | 0 | 0 | 0 | 0 | 0 |
| 96 | 00000110 | 0 | 0 | 0 | 1 | 0 | 1 | 0 | 1 | 0 | 0 | 0 | 1 | 0 | 0 | 0 | 1 | 0 | 0 | 1 | 0 | 0 | 0 | 0 | 0 |
| 97 | 10000110 | 1 | 0 | 0 | 0 | 1 | 0 | 0 | 1 | 1 | 0 | 0 | 1 | 1 | 0 | 1 | 1 | 0 | 0 | 1 | 0 | 0 | 1 | 1 | 0 |
| 98 | 01000110 | 0 | 1 | 0 | 1 | 1 | 0 | 1 | 1 | 0 | 1 | 0 | 1 | 0 | 1 | 0 | 0 | 0 | 0 | 1 | 0 | 0 | 1 | 1 | 0 |
| 99 | 11000110 | 1 | 1 | 0 | 0 | 0 | 1 | 1 | 1 | 1 | 1 | 0 | 1 | 1 | 1 | 1 | 0 | 0 | 0 | 1 | 0 | 0 | 0 | 0 | 0 |
| 100 | 00100110 | 0 | 0 | 1 | 1 | 0 | 0 | 1 | 0 | 0 | 0 | 0 | 1 | 0 | 0 | 0 | 0 | 1 | 0 | 1 | 0 | 1 | 0 | 1 | 1 |
| 101 | 10100110 | 1 | 0 | 1 | 0 | 1 | 1 | 1 | 0 | 1 | 0 | 0 | 1 | 1 | 0 | 1 | 0 | 1 | 0 | 1 | 0 | 1 | 1 | 1 | 1 |
| 102 | 01100110 | 0 | 1 | 1 | 1 | 1 | 1 | 0 | 0 | 0 | 1 | 0 | 1 | 0 | 1 | 0 | 1 | 1 | 0 | 1 | 0 | 1 | 1 | 0 | 1 |
| 103 | 11100110 | 1 | 1 | 1 | 0 | 0 | 0 | 0 | 0 | 1 | 1 | 0 | 1 | 1 | 1 | 1 | 1 | 1 | 0 | 1 | 0 | 1 | 0 | 1 | 1 |
| 104 | 00010110 | 1 | 0 | 0 | 1 | 0 | 1 | 0 | 0 | 0 | 0 | 1 | 1 | 1 | 0 | 0 | 0 | 0 | 0 | 1 | 0 | 0 | 1 | 1 | 1 |
| 105 | 10010110 | 0 | 0 | 0 | 0 | 1 | 1 | 0 | 0 | 1 | 0 | 1 | 1 | 0 | 0 | 1 | 0 | 0 | 0 | 1 | 0 | 0 | 0 | 0 | 1 |
| 106 | 01010110 | 1 | 1 | 0 | 1 | 0 | 1 | 0 | 0 | 0 | 1 | 1 | 1 | 1 | 1 | 0 | 1 | 0 | 0 | 1 | 0 | 0 | 0 | 0 | 1 |
| 107 | 11010110 | 0 | 1 | 0 | 0 | 1 | 0 | 0 | 0 | 1 | 1 | 1 | 1 | 0 | 1 | 1 | 1 | 0 | 0 | 1 | 0 | 0 | 1 | 1 | 1 |
| 108 | 00110110 | 1 | 0 | 1 | 1 | 1 | 1 | 0 | 1 | 0 | 0 | 1 | 1 | 0 | 1 | 0 | 1 | 1 | 0 | 1 | 0 | 1 | 1 | 0 | 0 |
| 109 | 10110110 | 0 | 0 | 1 | 0 | 0 | 0 | 0 | 1 | 1 | 0 | 1 | 1 | 0 | 0 | 1 | 1 | 1 | 0 | 1 | 0 | 1 | 0 | 1 | 0 |
| 110 | 01110110 | 1 | 1 | 1 | 1 | 0 | 0 | 1 | 1 | 0 | 1 | 1 | 1 | 1 | 1 | 0 | 0 | 1 | 0 | 1 | 0 | 1 | 0 | 1 | 0 |
| 111 | 11110110 | 0 | 1 | 1 | 0 | 1 | 1 | 1 | 1 | 1 | 1 | 1 | 1 | 0 | 1 | 1 | 0 | 1 | 0 | 1 | 0 | 1 | 1 | 0 | 0 |
| 112 | 00001110 | 1 | 1 | 0 | 0 | 1 | 1 | 1 | 0 | 0 | 0 | 0 | 1 | 1 | 1 | 0 | 0 | 0 | 1 | 1 | 0 | 0 | 0 | 1 | 0 |
| 113 | 10001110 | 0 | 1 | 0 | 1 | 0 | 0 | 1 | 0 | 1 | 0 | 0 | 1 | 0 | 1 | 1 | 0 | 0 | 1 | 1 | 0 | 0 | 0 | 0 | 1 |
| 114 | 01001110 | 1 | 0 | 0 | 0 | 0 | 0 | 0 | 0 | 0 | 1 | 0 | 1 | 1 | 0 | 1 | 1 | 0 | 1 | 1 | 0 | 0 | 0 | 1 | 1 |
| 115 | 11001110 | 0 | 0 | 0 | 1 | 1 | 1 | 0 | 0 | 1 | 1 | 0 | 1 | 0 | 0 | 0 | 1 | 0 | 1 | 1 | 0 | 0 | 1 | 0 | 1 |
| 116 | 00101110 | 1 | 1 | 1 | 0 | 1 | 0 | 0 | 1 | 0 | 0 | 0 | 1 | 1 | 1 | 1 | 1 | 1 | 1 | 1 | 0 | 1 | 1 | 1 | 0 |
| 117 | 10101110 | 0 | 1 | 1 | 1 | 0 | 1 | 0 | 1 | 1 | 0 | 0 | 1 | 0 | 1 | 0 | 1 | 1 | 1 | 1 | 0 | 1 | 0 | 0 | 0 |
| 118 | 01101110 | 1 | 0 | 1 | 0 | 0 | 1 | 1 | 1 | 0 | 1 | 0 | 1 | 1 | 0 | 1 | 0 | 1 | 1 | 1 | 0 | 1 | 0 | 0 | 0 |
| 119 | 11101110 | 0 | 0 | 1 | 1 | 1 | 0 | 1 | 1 | 1 | 1 | 0 | 1 | 0 | 0 | 0 | 0 | 1 | 1 | 1 | 0 | 1 | 1 | 1 | 0 |
| 120 | 00011110 | 0 | 1 | 0 | 1 | 0 | 0 | 0 | 1 | 0 | 0 | 1 | 1 | 1 | 1 | 1 | 0 | 0 | 1 | 1 | 0 | 0 | 0 | 1 | 0 |
| 121 | 10011110 | 1 | 1 | 0 | 1 | 1 | 1 | 0 | 1 | 1 | 0 | 1 | 1 | 1 | 1 | 0 | 1 | 0 | 1 | 1 | 0 | 0 | 1 | 0 | 0 |

TABLE II-continued

| DATA WORD | STANDARD ERROR CORRECTING CODE 1x | | | | | | | | 2x | | | | | | | | IMPROVED ERROR CORRECTING CODE 1y | | | | | | | | 2y | | | | | | | |
|---|---|---|---|---|---|---|---|---|---|---|---|---|---|---|---|---|---|---|---|---|---|---|---|---|---|---|---|---|---|---|---|
| X | 1 2 3 4 5 6 7 8 | | | | | | | | A | B | C | D | E | F | G | H | 1 | 2 | 4 | 7 | A | B | D | G | 3 | 5 | 6 | 8 | C | E | F | H |
| 122 | 0 1 0 1 1 1 1 0 | | | | | | | | 0 | 0 | 0 | 0 | 1 | 1 | 1 | 1 | 0 | 1 | 1 | 1 | 0 | 0 | 1 | 0 | 0 | 1 | 1 | 0 | 0 | 1 | 0 | 0 |
| 123 | 1 1 0 1 1 1 1 0 | | | | | | | | 1 | 0 | 0 | 1 | 0 | 0 | 1 | 1 | 1 | 1 | 1 | 1 | 1 | 0 | 0 | 0 | 0 | 1 | 1 | 0 | 0 | 0 | 1 | 0 |
| 124 | 0 0 1 1 1 1 1 0 | | | | | | | | 0 | 1 | 1 | 0 | 0 | 1 | 1 | 0 | 0 | 0 | 1 | 1 | 0 | 1 | 1 | 0 | 1 | 1 | 1 | 0 | 1 | 0 | 0 | 1 |
| 125 | 1 0 1 1 1 1 1 0 | | | | | | | | 1 | 1 | 1 | 1 | 1 | 0 | 1 | 0 | 1 | 0 | 1 | 1 | 1 | 1 | 0 | 0 | 1 | 1 | 1 | 0 | 1 | 1 | 1 | 1 |
| 126 | 0 1 1 1 1 1 1 0 | | | | | | | | 0 | 0 | 1 | 0 | 1 | 0 | 0 | 0 | 0 | 1 | 1 | 0 | 0 | 1 | 1 | 0 | 1 | 1 | 1 | 0 | 1 | 1 | 1 | 1 |
| 127 | 1 1 1 1 1 1 1 0 | | | | | | | | 1 | 0 | 1 | 1 | 0 | 1 | 0 | 0 | 1 | 1 | 1 | 1 | 1 | 0 | 0 | 1 | 1 | 1 | 1 | 0 | 1 | 0 | 0 | 1 |
| 128 | 0 0 0 0 0 0 0 1 | | | | | | | | 0 | 1 | 1 | 1 | 0 | 0 | 1 | 0 | 0 | 0 | 0 | 0 | 0 | 1 | 0 | 0 | 0 | 0 | 0 | 1 | 1 | 0 | 1 | 1 |
| 129 | 1 0 0 0 0 0 0 1 | | | | | | | | 1 | 1 | 1 | 0 | 1 | 1 | 1 | 0 | 1 | 0 | 0 | 0 | 1 | 1 | 1 | 0 | 0 | 0 | 0 | 1 | 1 | 1 | 0 | 1 |
| 130 | 0 1 0 0 0 0 0 1 | | | | | | | | 0 | 0 | 1 | 1 | 1 | 1 | 0 | 0 | 0 | 1 | 0 | 0 | 0 | 0 | 0 | 1 | 0 | 0 | 0 | 1 | 1 | 1 | 0 | 1 |
| 131 | 1 1 0 0 0 0 0 1 | | | | | | | | 1 | 0 | 1 | 0 | 0 | 0 | 0 | 0 | 1 | 1 | 0 | 0 | 1 | 0 | 1 | 1 | 0 | 0 | 0 | 1 | 1 | 0 | 1 | 1 |
| 132 | 0 0 1 0 0 0 0 1 | | | | | | | | 0 | 1 | 0 | 1 | 0 | 1 | 0 | 1 | 0 | 0 | 0 | 0 | 0 | 1 | 0 | 1 | 1 | 0 | 0 | 1 | 0 | 0 | 0 | 0 |
| 133 | 1 0 1 0 0 0 0 1 | | | | | | | | 1 | 1 | 0 | 0 | 1 | 0 | 0 | 1 | 1 | 0 | 0 | 0 | 1 | 1 | 1 | 1 | 1 | 0 | 0 | 1 | 0 | 1 | 1 | 0 |
| 134 | 0 1 1 0 0 0 0 1 | | | | | | | | 0 | 0 | 0 | 1 | 1 | 0 | 1 | 1 | 0 | 1 | 0 | 0 | 0 | 0 | 0 | 1 | 1 | 0 | 0 | 1 | 0 | 1 | 1 | 0 |
| 135 | 1 1 1 0 0 0 0 1 | | | | | | | | 1 | 0 | 0 | 0 | 0 | 1 | 1 | 1 | 1 | 1 | 0 | 0 | 1 | 0 | 1 | 0 | 1 | 0 | 0 | 1 | 0 | 0 | 0 | 0 |
| 136 | 0 0 0 1 0 0 0 1 | | | | | | | | 1 | 1 | 1 | 1 | 1 | 1 | 0 | 0 | 0 | 0 | 1 | 0 | 1 | 1 | 0 | 1 | 0 | 0 | 0 | 1 | 1 | 1 | 0 | 0 |
| 137 | 1 0 0 1 0 0 0 1 | | | | | | | | 0 | 1 | 1 | 0 | 0 | 0 | 0 | 1 | 1 | 0 | 1 | 0 | 0 | 1 | 1 | 1 | 0 | 0 | 0 | 1 | 1 | 0 | 1 | 0 |
| 138 | 0 1 0 1 0 0 0 1 | | | | | | | | 1 | 0 | 1 | 1 | 0 | 0 | 1 | 1 | 0 | 1 | 1 | 0 | 1 | 0 | 0 | 0 | 0 | 0 | 0 | 1 | 1 | 0 | 1 | 0 |
| 139 | 1 1 0 1 0 0 0 1 | | | | | | | | 0 | 0 | 1 | 0 | 1 | 1 | 1 | 1 | 1 | 1 | 1 | 0 | 0 | 0 | 1 | 0 | 0 | 0 | 0 | 1 | 1 | 1 | 0 | 0 |
| 140 | 0 0 1 1 0 0 0 1 | | | | | | | | 1 | 1 | 0 | 1 | 1 | 0 | 1 | 0 | 0 | 0 | 1 | 0 | 1 | 1 | 0 | 0 | 1 | 0 | 0 | 1 | 0 | 1 | 1 | 1 |
| 141 | 1 0 1 1 0 0 0 1 | | | | | | | | 0 | 1 | 0 | 0 | 0 | 1 | 1 | 0 | 1 | 0 | 1 | 0 | 0 | 1 | 1 | 0 | 1 | 0 | 0 | 1 | 0 | 0 | 0 | 1 |
| 142 | 0 1 1 1 0 0 0 1 | | | | | | | | 1 | 0 | 0 | 1 | 0 | 1 | 0 | 0 | 0 | 1 | 1 | 0 | 1 | 0 | 0 | 1 | 1 | 0 | 0 | 1 | 0 | 0 | 0 | 1 |
| 143 | 1 1 1 1 0 0 0 1 | | | | | | | | 0 | 0 | 0 | 0 | 1 | 0 | 0 | 0 | 1 | 1 | 1 | 0 | 1 | 1 | 1 | 1 | 1 | 0 | 0 | 1 | 0 | 1 | 1 | 1 |
| 144 | 0 0 0 0 1 0 0 1 | | | | | | | | 1 | 0 | 1 | 0 | 1 | 0 | 0 | 1 | 0 | 0 | 0 | 1 | 0 | 1 | 1 | 1 | 0 | 1 | 0 | 1 | 1 | 1 | 1 | 0 |
| 145 | 1 0 0 0 1 0 0 1 | | | | | | | | 0 | 0 | 1 | 1 | 0 | 1 | 0 | 1 | 1 | 0 | 0 | 0 | 0 | 0 | 0 | 1 | 0 | 1 | 0 | 1 | 1 | 0 | 0 | 0 |
| 146 | 0 1 0 0 1 0 0 1 | | | | | | | | 1 | 1 | 1 | 0 | 0 | 1 | 1 | 1 | 0 | 1 | 0 | 0 | 1 | 1 | 1 | 0 | 0 | 1 | 0 | 1 | 0 | 0 | 0 | 0 |
| 147 | 1 1 0 0 1 0 0 1 | | | | | | | | 0 | 1 | 1 | 1 | 1 | 0 | 1 | 1 | 1 | 1 | 0 | 0 | 0 | 1 | 0 | 0 | 0 | 1 | 0 | 1 | 1 | 1 | 1 | 0 |
| 148 | 0 0 1 0 1 0 0 1 | | | | | | | | 1 | 0 | 0 | 0 | 1 | 1 | 1 | 0 | 0 | 0 | 0 | 0 | 1 | 0 | 1 | 0 | 1 | 1 | 0 | 1 | 0 | 1 | 0 | 1 |
| 149 | 1 0 1 0 1 0 0 1 | | | | | | | | 0 | 0 | 0 | 1 | 0 | 0 | 1 | 0 | 1 | 0 | 0 | 0 | 0 | 0 | 0 | 1 | 1 | 1 | 0 | 1 | 0 | 0 | 1 | 1 |
| 150 | 0 1 1 0 1 0 0 1 | | | | | | | | 1 | 1 | 0 | 0 | 0 | 0 | 0 | 0 | 0 | 1 | 0 | 0 | 1 | 1 | 1 | 1 | 1 | 1 | 0 | 1 | 0 | 0 | 1 | 1 |
| 151 | 1 1 1 0 1 0 0 1 | | | | | | | | 0 | 1 | 0 | 1 | 1 | 1 | 0 | 0 | 1 | 1 | 0 | 0 | 0 | 1 | 0 | 1 | 1 | 1 | 0 | 1 | 0 | 1 | 0 | 1 |
| 152 | 0 0 0 1 1 0 0 1 | | | | | | | | 0 | 0 | 1 | 0 | 0 | 1 | 1 | 0 | 0 | 0 | 1 | 0 | 0 | 1 | 0 | 1 | 0 | 1 | 0 | 1 | 1 | 0 | 0 | 1 |
| 153 | 1 0 0 1 1 0 0 1 | | | | | | | | 1 | 0 | 1 | 1 | 1 | 0 | 1 | 0 | 1 | 0 | 1 | 0 | 1 | 0 | 0 | 0 | 0 | 1 | 0 | 1 | 1 | 1 | 1 | 1 |
| 154 | 0 1 0 1 1 0 0 1 | | | | | | | | 0 | 1 | 1 | 0 | 1 | 0 | 0 | 0 | 0 | 1 | 1 | 0 | 0 | 1 | 1 | 1 | 0 | 1 | 0 | 1 | 1 | 1 | 1 | 1 |
| 155 | 1 1 0 1 1 0 0 1 | | | | | | | | 1 | 1 | 1 | 1 | 0 | 1 | 0 | 0 | 1 | 1 | 1 | 0 | 1 | 1 | 0 | 1 | 0 | 1 | 0 | 1 | 1 | 0 | 0 | 1 |
| 156 | 0 0 1 1 1 0 0 1 | | | | | | | | 0 | 0 | 0 | 0 | 0 | 0 | 0 | 1 | 0 | 0 | 1 | 0 | 0 | 1 | 1 | 1 | 1 | 1 | 0 | 1 | 0 | 0 | 1 | 0 |
| 157 | 1 0 1 1 1 0 0 1 | | | | | | | | 1 | 0 | 0 | 1 | 1 | 1 | 0 | 1 | 1 | 0 | 1 | 0 | 1 | 0 | 0 | 1 | 1 | 1 | 0 | 1 | 0 | 1 | 0 | 0 |
| 158 | 0 1 1 1 1 0 0 1 | | | | | | | | 0 | 1 | 0 | 0 | 1 | 1 | 1 | 1 | 0 | 1 | 1 | 0 | 0 | 1 | 1 | 0 | 1 | 1 | 0 | 1 | 0 | 1 | 0 | 0 |
| 159 | 1 1 1 1 1 0 0 1 | | | | | | | | 1 | 1 | 0 | 1 | 0 | 0 | 1 | 1 | 1 | 1 | 1 | 0 | 1 | 1 | 0 | 0 | 1 | 1 | 0 | 1 | 0 | 0 | 1 | 0 |
| 160 | 0 0 0 0 0 1 0 1 | | | | | | | | 1 | 0 | 0 | 0 | 0 | 0 | 1 | 1 | 0 | 0 | 0 | 0 | 1 | 0 | 1 | 0 | 0 | 0 | 1 | 1 | 0 | 0 | 1 | 0 |
| 161 | 1 0 0 0 0 1 0 1 | | | | | | | | 0 | 0 | 0 | 1 | 1 | 1 | 1 | 1 | 1 | 0 | 0 | 0 | 0 | 0 | 0 | 0 | 0 | 0 | 1 | 1 | 0 | 1 | 0 | 0 |
| 162 | 0 1 0 0 0 1 0 1 | | | | | | | | 1 | 1 | 0 | 0 | 1 | 1 | 0 | 1 | 0 | 1 | 0 | 0 | 1 | 1 | 1 | 0 | 0 | 0 | 1 | 1 | 0 | 1 | 0 | 0 |
| 163 | 1 1 0 0 0 1 0 1 | | | | | | | | 0 | 1 | 0 | 1 | 0 | 0 | 0 | 1 | 1 | 1 | 0 | 0 | 0 | 1 | 0 | 1 | 0 | 0 | 1 | 1 | 0 | 0 | 1 | 0 |
| 164 | 0 0 1 0 0 1 0 1 | | | | | | | | 1 | 0 | 1 | 0 | 0 | 0 | 0 | 0 | 0 | 0 | 0 | 0 | 1 | 0 | 1 | 1 | 1 | 0 | 1 | 1 | 0 | 0 | 0 | 1 |
| 165 | 1 0 1 0 0 1 0 1 | | | | | | | | 0 | 0 | 1 | 1 | 1 | 0 | 0 | 1 | 1 | 0 | 0 | 0 | 0 | 0 | 1 | 1 | 0 | 0 | 1 | 1 | 1 | 1 | 1 | 1 |
| 166 | 0 1 1 0 0 1 0 1 | | | | | | | | 1 | 1 | 1 | 0 | 1 | 0 | 1 | 0 | 0 | 1 | 0 | 0 | 1 | 1 | 1 | 0 | 1 | 0 | 1 | 1 | 1 | 1 | 1 | 1 |
| 167 | 1 1 1 0 0 1 0 1 | | | | | | | | 0 | 1 | 1 | 1 | 0 | 1 | 1 | 0 | 1 | 1 | 0 | 0 | 0 | 1 | 0 | 0 | 1 | 0 | 1 | 1 | 1 | 0 | 0 | 1 |
| 168 | 0 0 0 1 0 1 0 1 | | | | | | | | 0 | 0 | 0 | 0 | 1 | 1 | 0 | 0 | 0 | 0 | 1 | 0 | 0 | 1 | 1 | 0 | 0 | 0 | 1 | 1 | 0 | 1 | 0 | 1 |
| 169 | 1 0 0 1 0 1 0 1 | | | | | | | | 1 | 0 | 0 | 1 | 0 | 0 | 0 | 0 | 1 | 0 | 1 | 0 | 0 | 1 | 0 | 1 | 0 | 0 | 1 | 1 | 0 | 0 | 1 | 1 |
| 170 | 0 1 0 1 0 1 0 1 | | | | | | | | 0 | 1 | 0 | 0 | 0 | 0 | 1 | 0 | 0 | 1 | 1 | 0 | 1 | 1 | 0 | 0 | 0 | 0 | 1 | 1 | 0 | 0 | 1 | 1 |
| 171 | 1 1 0 1 0 1 0 1 | | | | | | | | 1 | 1 | 0 | 1 | 1 | 1 | 1 | 0 | 1 | 1 | 0 | 0 | 1 | 1 | 0 | 0 | 0 | 0 | 1 | 1 | 0 | 1 | 0 | 1 |
| 172 | 0 0 1 1 0 1 0 1 | | | | | | | | 0 | 0 | 1 | 0 | 1 | 0 | 1 | 1 | 0 | 1 | 0 | 0 | 0 | 0 | 1 | 0 | 1 | 0 | 1 | 1 | 1 | 1 | 1 | 0 |
| 173 | 1 0 1 1 0 1 0 1 | | | | | | | | 1 | 0 | 1 | 1 | 0 | 1 | 1 | 1 | 1 | 0 | 1 | 0 | 1 | 0 | 0 | 0 | 1 | 0 | 1 | 1 | 0 | 0 | 0 | 0 |
| 174 | 0 1 1 1 0 1 0 1 | | | | | | | | 0 | 1 | 1 | 0 | 0 | 1 | 0 | 1 | 0 | 1 | 1 | 0 | 1 | 1 | 1 | 1 | 0 | 1 | 1 | 1 | 0 | 0 | 0 | 0 |
| 175 | 1 1 1 1 0 1 0 1 | | | | | | | | 1 | 1 | 1 | 1 | 1 | 0 | 0 | 1 | 1 | 1 | 1 | 0 | 1 | 1 | 0 | 1 | 1 | 0 | 1 | 1 | 1 | 1 | 1 | 0 |
| 176 | 0 0 0 0 1 1 0 1 | | | | | | | | 0 | 1 | 0 | 1 | 1 | 0 | 0 | 0 | 0 | 0 | 0 | 0 | 0 | 1 | 0 | 1 | 0 | 1 | 1 | 0 | 1 | 1 | 1 | 1 |
| 177 | 1 0 0 0 1 1 0 1 | | | | | | | | 1 | 1 | 0 | 0 | 0 | 1 | 0 | 0 | 1 | 0 | 0 | 0 | 1 | 1 | 1 | 1 | 1 | 1 | 1 | 0 | 0 | 0 | 0 | 1 |
| 178 | 0 1 0 0 1 1 0 1 | | | | | | | | 0 | 0 | 0 | 1 | 0 | 1 | 1 | 0 | 0 | 1 | 0 | 0 | 0 | 0 | 0 | 0 | 0 | 1 | 1 | 0 | 0 | 0 | 0 | 1 |
| 179 | 1 1 0 0 1 1 0 1 | | | | | | | | 1 | 0 | 0 | 0 | 1 | 0 | 1 | 0 | 1 | 1 | 0 | 0 | 1 | 0 | 1 | 0 | 0 | 1 | 1 | 0 | 1 | 1 | 1 | 1 |
| 180 | 0 0 1 0 1 1 0 1 | | | | | | | | 0 | 1 | 1 | 1 | 1 | 1 | 1 | 0 | 0 | 0 | 0 | 0 | 0 | 1 | 0 | 0 | 1 | 1 | 1 | 1 | 1 | 1 | 0 | 0 |
| 181 | 1 0 1 0 1 1 0 1 | | | | | | | | 1 | 1 | 1 | 0 | 0 | 0 | 1 | 1 | 1 | 0 | 0 | 0 | 1 | 1 | 1 | 0 | 1 | 1 | 1 | 1 | 1 | 0 | 1 | 0 |
| 182 | 0 1 1 0 1 1 0 1 | | | | | | | | 0 | 0 | 1 | 1 | 0 | 0 | 0 | 1 | 0 | 1 | 0 | 0 | 0 | 0 | 0 | 1 | 1 | 1 | 1 | 1 | 0 | 1 | 0 |
| 183 | 1 1 1 0 1 1 0 1 | | | | | | | | 1 | 0 | 1 | 0 | 1 | 1 | 0 | 1 | 1 | 1 | 0 | 0 | 1 | 0 | 1 | 1 | 1 | 1 | 1 | 1 | 1 | 1 | 0 | 0 |
| 184 | 0 0 0 1 1 1 0 1 | | | | | | | | 1 | 1 | 0 | 1 | 0 | 1 | 1 | 1 | 0 | 0 | 1 | 0 | 1 | 1 | 0 | 0 | 0 | 1 | 1 | 0 | 0 | 0 | 0 | 0 |
| 185 | 1 0 0 1 1 1 0 1 | | | | | | | | 0 | 1 | 0 | 0 | 1 | 0 | 1 | 1 | 1 | 0 | 1 | 0 | 0 | 1 | 0 | 0 | 0 | 1 | 1 | 0 | 1 | 1 | 1 | 0 |
| 186 | 0 1 0 1 1 1 0 1 | | | | | | | | 1 | 0 | 0 | 1 | 1 | 0 | 0 | 1 | 0 | 1 | 1 | 0 | 1 | 0 | 0 | 1 | 0 | 1 | 1 | 0 | 1 | 1 | 1 | 0 |
| 187 | 1 1 0 1 1 1 0 1 | | | | | | | | 0 | 0 | 0 | 0 | 0 | 1 | 0 | 1 | 1 | 1 | 1 | 0 | 0 | 0 | 1 | 1 | 0 | 1 | 1 | 0 | 0 | 0 | 0 | 0 |
| 188 | 0 0 1 1 1 1 0 1 | | | | | | | | 1 | 1 | 1 | 1 | 0 | 0 | 0 | 0 | 0 | 0 | 1 | 0 | 1 | 1 | 0 | 1 | 1 | 1 | 1 | 1 | 1 | 0 | 1 | 1 |
| 189 | 1 0 1 1 1 1 0 1 | | | | | | | | 0 | 1 | 1 | 0 | 1 | 1 | 0 | 1 | 1 | 0 | 1 | 0 | 0 | 1 | 1 | 1 | 1 | 0 | 1 | 1 | 1 | 1 | 0 | 1 |
| 190 | 0 1 1 1 1 1 0 1 | | | | | | | | 1 | 0 | 1 | 1 | 1 | 1 | 1 | 0 | 0 | 1 | 1 | 0 | 1 | 0 | 0 | 1 | 1 | 0 | 1 | 1 | 1 | 1 | 0 | 1 |
| 191 | 1 1 1 1 1 1 0 1 | | | | | | | | 0 | 0 | 1 | 0 | 0 | 0 | 1 | 0 | 1 | 1 | 1 | 0 | 0 | 0 | 1 | 0 | 1 | 1 | 1 | 1 | 1 | 0 | 1 | 1 |
| 192 | 0 0 0 0 0 0 1 1 | | | | | | | | 1 | 0 | 0 | 0 | 1 | 0 | 1 | 1 | 0 | 0 | 0 | 1 | 1 | 0 | 0 | 0 | 0 | 0 | 0 | 1 | 0 | 0 | 0 | 1 |
| 193 | 1 0 0 0 0 0 1 1 | | | | | | | | 0 | 0 | 0 | 1 | 0 | 1 | 1 | 0 | 1 | 0 | 0 | 1 | 0 | 1 | 0 | 0 | 0 | 0 | 0 | 1 | 0 | 1 | 1 | 1 |
| 194 | 0 1 0 0 0 0 1 1 | | | | | | | | 1 | 1 | 0 | 1 | 1 | 0 | 0 | 0 | 0 | 1 | 0 | 1 | 1 | 0 | 1 | 0 | 0 | 0 | 0 | 1 | 0 | 1 | 1 | 1 |
| 195 | 1 1 0 0 0 0 1 1 | | | | | | | | 0 | 1 | 0 | 0 | 0 | 1 | 0 | 0 | 1 | 1 | 0 | 1 | 0 | 1 | 1 | 0 | 0 | 0 | 1 | 1 | 0 | 0 | 0 | 1 |
| 196 | 0 0 1 0 0 0 1 1 | | | | | | | | 1 | 0 | 1 | 1 | 0 | 0 | 0 | 1 | 0 | 0 | 1 | 1 | 0 | 1 | 0 | 1 | 1 | 0 | 0 | 1 | 1 | 0 | 1 | 0 |
| 197 | 1 0 1 0 0 0 1 1 | | | | | | | | 0 | 0 | 1 | 0 | 1 | 0 | 1 | 1 | 1 | 0 | 1 | 1 | 1 | 1 | 0 | 0 | 1 | 0 | 0 | 1 | 0 | 0 | 0 | 0 |
| 198 | 0 1 1 0 0 0 1 1 | | | | | | | | 1 | 1 | 1 | 1 | 1 | 1 | 1 | 1 | 0 | 1 | 1 | 1 | 1 | 0 | 0 | 0 | 1 | 0 | 0 | 1 | 1 | 1 | 0 | 0 |
| 199 | 1 1 1 0 0 0 1 1 | | | | | | | | 0 | 1 | 1 | 0 | 0 | 0 | 1 | 1 | 1 | 1 | 0 | 1 | 0 | 1 | 0 | 1 | 0 | 0 | 1 | 1 | 0 | 1 | 0 | 0 |

TABLE II-continued

| DATA WORD | STANDARD ERROR CORRECTING CODE | | | | | | | | | IMPROVED ERROR CORRECTING CODE | | | | | | | | | | | | | |
|---|---|---|---|---|---|---|---|---|---|---|---|---|---|---|---|---|---|---|---|---|---|---|---|
| | 1x | | | | | | | | 2x | | | | | | | | 1y | | | | | 2y | | |
| X | 1 2 3 4 5 6 7 8 | A | B | C | D | E | F | G | H | 1 | 2 | 4 | 7 | A | B | D | G | 3 | 5 | 6 | 8 | C | E | F | H |
| 200 | 0 0 0 1 0 0 1 1 | 0 | 0 | 0 | 1 | 1 | 0 | 0 | 1 | 0 | 0 | 1 | 1 | 0 | 0 | 0 | 1 | 0 | 0 | 0 | 1 | 0 | 1 | 1 | 0 |
| 201 | 1 0 0 1 0 0 1 1 | 1 | 0 | 0 | 0 | 0 | 1 | 0 | 1 | 1 | 0 | 1 | 1 | 1 | 0 | 1 | 1 | 0 | 0 | 0 | 1 | 0 | 0 | 0 | 0 |
| 202 | 0 1 0 1 0 0 1 1 | 0 | 1 | 0 | 1 | 0 | 1 | 1 | 1 | 0 | 1 | 1 | 1 | 0 | 1 | 0 | 0 | 0 | 0 | 0 | 1 | 0 | 0 | 0 | 0 |
| 203 | 1 1 0 1 0 0 1 1 | 1 | 1 | 0 | 0 | 1 | 0 | 1 | 1 | 1 | 1 | 1 | 1 | 1 | 1 | 1 | 0 | 0 | 0 | 0 | 1 | 0 | 1 | 1 | 0 |
| 204 | 0 0 1 1 0 0 1 1 | 0 | 0 | 1 | 1 | 1 | 1 | 1 | 0 | 0 | 0 | 1 | 1 | 0 | 0 | 0 | 0 | 1 | 0 | 0 | 1 | 1 | 1 | 0 | 1 |
| 205 | 1 0 1 1 0 0 1 1 | 1 | 0 | 1 | 0 | 0 | 0 | 1 | 0 | 1 | 0 | 1 | 1 | 1 | 0 | 1 | 0 | 1 | 0 | 0 | 1 | 1 | 0 | 1 | 1 |
| 206 | 0 1 1 1 0 0 1 1 | 0 | 1 | 1 | 1 | 0 | 0 | 0 | 0 | 0 | 1 | 1 | 1 | 0 | 1 | 0 | 1 | 1 | 0 | 0 | 1 | 1 | 0 | 1 | 1 |
| 207 | 1 1 1 1 0 0 1 1 | 1 | 1 | 1 | 0 | 1 | 1 | 0 | 0 | 1 | 1 | 1 | 1 | 1 | 1 | 1 | 1 | 1 | 0 | 0 | 1 | 1 | 1 | 0 | 1 |
| 208 | 0 0 0 0 1 0 1 1 | 0 | 1 | 0 | 0 | 1 | 1 | 0 | 1 | 0 | 0 | 0 | 1 | 0 | 1 | 1 | 1 | 0 | 1 | 0 | 1 | 0 | 1 | 0 | 0 |
| 209 | 1 0 0 0 1 0 1 1 | 1 | 1 | 0 | 1 | 0 | 0 | 0 | 1 | 1 | 0 | 0 | 1 | 1 | 1 | 0 | 1 | 0 | 1 | 0 | 1 | 0 | 0 | 1 | 0 |
| 210 | 0 1 0 0 1 0 1 1 | 0 | 0 | 0 | 0 | 0 | 0 | 1 | 1 | 0 | 1 | 0 | 1 | 0 | 0 | 1 | 0 | 0 | 1 | 0 | 1 | 0 | 0 | 1 | 0 |
| 211 | 1 1 0 0 1 0 1 1 | 1 | 0 | 0 | 1 | 1 | 1 | 1 | 1 | 1 | 1 | 0 | 1 | 1 | 0 | 0 | 0 | 0 | 1 | 0 | 1 | 0 | 1 | 0 | 0 |
| 212 | 0 0 1 0 1 0 1 1 | 0 | 1 | 1 | 0 | 1 | 0 | 1 | 0 | 0 | 0 | 0 | 1 | 0 | 1 | 1 | 0 | 1 | 1 | 0 | 1 | 1 | 1 | 1 | 1 |
| 213 | 1 0 1 0 1 0 1 1 | 1 | 1 | 1 | 1 | 0 | 1 | 1 | 0 | 1 | 0 | 0 | 1 | 1 | 1 | 0 | 0 | 1 | 1 | 0 | 1 | 1 | 0 | 0 | 1 |
| 214 | 0 1 1 0 1 0 1 1 | 0 | 0 | 1 | 0 | 0 | 1 | 0 | 0 | 0 | 1 | 0 | 1 | 0 | 0 | 1 | 1 | 1 | 1 | 0 | 1 | 1 | 0 | 0 | 1 |
| 215 | 1 1 1 0 1 0 1 1 | 1 | 0 | 1 | 1 | 1 | 0 | 0 | 0 | 1 | 1 | 0 | 1 | 1 | 0 | 0 | 1 | 1 | 1 | 0 | 1 | 1 | 1 | 1 | 1 |
| 216 | 0 0 0 1 1 0 1 1 | 1 | 1 | 0 | 0 | 0 | 0 | 1 | 0 | 0 | 0 | 1 | 1 | 1 | 1 | 0 | 0 | 0 | 1 | 0 | 1 | 0 | 0 | 1 | 1 |
| 217 | 1 0 0 1 1 0 1 1 | 0 | 1 | 0 | 1 | 1 | 1 | 1 | 0 | 1 | 0 | 1 | 1 | 0 | 1 | 0 | 0 | 0 | 1 | 0 | 1 | 0 | 1 | 0 | 1 |
| 218 | 0 1 0 1 1 0 1 1 | 1 | 0 | 0 | 0 | 1 | 1 | 0 | 0 | 0 | 1 | 1 | 1 | 0 | 1 | 1 | 0 | 0 | 1 | 0 | 1 | 0 | 1 | 0 | 1 |
| 219 | 1 1 0 1 1 0 1 1 | 0 | 0 | 0 | 1 | 0 | 0 | 0 | 0 | 1 | 1 | 1 | 1 | 0 | 0 | 0 | 1 | 0 | 1 | 0 | 1 | 0 | 0 | 1 | 1 |
| 220 | 0 0 1 1 1 0 1 1 | 1 | 1 | 1 | 0 | 0 | 1 | 0 | 1 | 0 | 0 | 1 | 1 | 1 | 1 | 1 | 1 | 1 | 1 | 0 | 1 | 1 | 0 | 0 | 0 |
| 221 | 1 0 1 1 1 0 1 1 | 0 | 1 | 1 | 1 | 1 | 0 | 0 | 1 | 1 | 0 | 1 | 1 | 0 | 1 | 0 | 1 | 1 | 1 | 0 | 1 | 1 | 1 | 1 | 0 |
| 222 | 0 1 1 1 1 0 1 1 | 1 | 0 | 1 | 0 | 1 | 0 | 1 | 0 | 0 | 1 | 1 | 1 | 1 | 0 | 1 | 0 | 1 | 1 | 0 | 1 | 1 | 1 | 1 | 0 |
| 223 | 1 1 1 1 1 0 1 1 | 0 | 0 | 1 | 1 | 0 | 1 | 1 | 1 | 1 | 1 | 1 | 1 | 0 | 0 | 0 | 1 | 1 | 1 | 0 | 1 | 1 | 0 | 0 | 0 |
| 224 | 0 0 0 0 0 1 1 1 | 0 | 1 | 1 | 0 | 0 | 1 | 1 | 1 | 0 | 0 | 0 | 1 | 0 | 1 | 1 | 0 | 0 | 0 | 1 | 1 | 1 | 0 | 0 | 0 |
| 225 | 1 0 0 0 0 1 1 1 | 1 | 1 | 1 | 1 | 1 | 0 | 1 | 1 | 1 | 0 | 0 | 1 | 1 | 1 | 0 | 0 | 0 | 0 | 1 | 1 | 1 | 1 | 1 | 0 |
| 226 | 0 1 0 0 0 1 1 1 | 0 | 0 | 1 | 0 | 1 | 0 | 0 | 1 | 0 | 1 | 0 | 1 | 0 | 0 | 1 | 1 | 0 | 0 | 1 | 1 | 1 | 1 | 1 | 0 |
| 227 | 1 1 0 0 0 1 1 1 | 1 | 0 | 1 | 1 | 0 | 1 | 0 | 1 | 1 | 1 | 0 | 1 | 1 | 0 | 0 | 1 | 0 | 0 | 1 | 1 | 1 | 0 | 0 | 0 |
| 228 | 0 0 1 0 0 1 1 1 | 0 | 1 | 0 | 0 | 0 | 0 | 0 | 0 | 0 | 0 | 0 | 1 | 0 | 1 | 1 | 1 | 1 | 0 | 1 | 1 | 0 | 0 | 1 | 1 |
| 229 | 1 0 1 0 0 1 1 1 | 1 | 1 | 0 | 1 | 1 | 1 | 0 | 0 | 1 | 0 | 0 | 1 | 1 | 1 | 0 | 1 | 1 | 0 | 1 | 1 | 0 | 1 | 0 | 1 |
| 230 | 0 1 1 0 0 1 1 1 | 0 | 0 | 0 | 0 | 1 | 1 | 1 | 0 | 0 | 1 | 0 | 1 | 0 | 0 | 1 | 0 | 1 | 0 | 1 | 1 | 0 | 1 | 0 | 1 |
| 231 | 1 1 1 0 0 1 1 1 | 1 | 0 | 0 | 1 | 0 | 0 | 1 | 0 | 1 | 1 | 0 | 1 | 1 | 0 | 0 | 0 | 1 | 0 | 1 | 1 | 0 | 0 | 1 | 1 |
| 232 | 0 0 0 1 0 1 1 1 | 1 | 1 | 1 | 0 | 1 | 0 | 0 | 0 | 0 | 0 | 1 | 1 | 1 | 1 | 1 | 0 | 0 | 0 | 1 | 1 | 1 | 1 | 1 | 1 |
| 233 | 1 0 0 1 0 1 1 1 | 0 | 1 | 1 | 1 | 0 | 1 | 0 | 0 | 1 | 0 | 1 | 1 | 0 | 1 | 0 | 1 | 0 | 0 | 1 | 1 | 1 | 0 | 0 | 1 |
| 234 | 0 1 0 1 0 1 1 1 | 1 | 0 | 1 | 0 | 0 | 1 | 1 | 0 | 0 | 1 | 1 | 1 | 1 | 0 | 1 | 0 | 0 | 0 | 1 | 1 | 1 | 0 | 0 | 1 |
| 235 | 1 1 0 1 0 1 1 1 | 0 | 0 | 1 | 1 | 1 | 0 | 1 | 0 | 1 | 1 | 1 | 1 | 0 | 0 | 0 | 0 | 0 | 0 | 1 | 1 | 1 | 1 | 1 | 1 |
| 236 | 0 0 1 1 0 1 1 1 | 1 | 1 | 0 | 0 | 1 | 1 | 1 | 0 | 0 | 0 | 1 | 1 | 1 | 1 | 0 | 1 | 1 | 0 | 1 | 1 | 0 | 1 | 0 | 0 |
| 237 | 1 0 1 1 0 1 1 1 | 0 | 1 | 0 | 1 | 0 | 0 | 1 | 1 | 1 | 0 | 1 | 1 | 0 | 1 | 0 | 0 | 1 | 0 | 1 | 1 | 0 | 0 | 1 | 0 |
| 238 | 0 1 1 1 0 1 1 1 | 1 | 0 | 0 | 0 | 0 | 0 | 0 | 1 | 0 | 1 | 1 | 1 | 1 | 0 | 1 | 1 | 1 | 0 | 1 | 1 | 0 | 0 | 1 | 0 |
| 239 | 1 1 1 1 0 1 1 1 | 0 | 0 | 0 | 1 | 1 | 1 | 0 | 1 | 1 | 1 | 1 | 1 | 0 | 0 | 0 | 1 | 1 | 0 | 1 | 1 | 0 | 1 | 0 | 0 |
| 240 | 0 0 0 0 1 1 1 1 | 1 | 0 | 1 | 1 | 1 | 1 | 0 | 0 | 0 | 0 | 0 | 1 | 1 | 0 | 0 | 1 | 0 | 1 | 1 | 1 | 1 | 1 | 0 | 1 |
| 241 | 1 0 0 0 1 1 1 1 | 0 | 0 | 1 | 0 | 0 | 0 | 0 | 0 | 1 | 0 | 0 | 1 | 0 | 0 | 1 | 1 | 1 | 1 | 1 | 1 | 1 | 0 | 1 | 1 |
| 242 | 0 1 0 0 1 1 1 1 | 1 | 1 | 1 | 1 | 0 | 0 | 1 | 0 | 0 | 1 | 0 | 1 | 1 | 1 | 0 | 0 | 0 | 1 | 1 | 1 | 1 | 0 | 1 | 1 |
| 243 | 1 1 0 0 1 1 1 1 | 0 | 1 | 1 | 0 | 1 | 1 | 1 | 0 | 1 | 1 | 0 | 1 | 0 | 1 | 1 | 0 | 0 | 1 | 1 | 1 | 1 | 1 | 0 | 1 |
| 244 | 0 0 1 0 1 1 1 1 | 1 | 0 | 0 | 1 | 1 | 0 | 1 | 1 | 0 | 0 | 0 | 1 | 1 | 0 | 0 | 0 | 1 | 1 | 1 | 1 | 0 | 1 | 1 | 0 |
| 245 | 1 0 1 0 1 1 1 1 | 0 | 0 | 0 | 0 | 0 | 1 | 1 | 1 | 1 | 0 | 0 | 1 | 0 | 0 | 1 | 0 | 1 | 1 | 1 | 1 | 0 | 0 | 0 | 0 |
| 246 | 0 1 1 0 1 1 1 1 | 1 | 1 | 0 | 1 | 0 | 1 | 0 | 1 | 0 | 1 | 0 | 1 | 1 | 1 | 0 | 1 | 1 | 1 | 1 | 1 | 0 | 0 | 0 | 0 |
| 247 | 1 1 1 0 1 1 1 1 | 0 | 1 | 0 | 0 | 1 | 0 | 0 | 1 | 1 | 1 | 0 | 1 | 0 | 1 | 1 | 1 | 1 | 1 | 1 | 1 | 0 | 1 | 1 | 0 |
| 248 | 0 0 0 1 1 1 1 1 | 0 | 0 | 1 | 1 | 0 | 0 | 1 | 1 | 0 | 0 | 1 | 1 | 0 | 0 | 0 | 0 | 0 | 1 | 1 | 1 | 1 | 0 | 1 | 0 |
| 249 | 1 0 0 1 1 1 1 1 | 1 | 0 | 1 | 0 | 1 | 1 | 1 | 1 | 1 | 0 | 1 | 1 | 1 | 0 | 0 | 0 | 1 | 1 | 1 | 1 | 1 | 1 | 0 | 0 |
| 250 | 0 1 0 1 1 1 1 1 | 0 | 1 | 1 | 1 | 1 | 1 | 0 | 1 | 0 | 1 | 1 | 1 | 0 | 1 | 0 | 1 | 0 | 1 | 1 | 1 | 1 | 1 | 0 | 0 |
| 251 | 1 1 0 1 1 1 1 1 | 1 | 1 | 1 | 0 | 0 | 0 | 0 | 1 | 1 | 1 | 1 | 1 | 1 | 1 | 1 | 0 | 0 | 1 | 1 | 1 | 1 | 0 | 1 | 0 |
| 252 | 0 0 1 1 1 1 1 1 | 0 | 0 | 0 | 1 | 0 | 1 | 0 | 0 | 0 | 0 | 1 | 1 | 0 | 0 | 0 | 1 | 1 | 1 | 1 | 1 | 0 | 0 | 0 | 1 |
| 253 | 1 0 1 1 1 1 1 1 | 1 | 0 | 0 | 0 | 1 | 0 | 0 | 0 | 1 | 0 | 1 | 1 | 1 | 0 | 1 | 1 | 1 | 1 | 1 | 1 | 0 | 1 | 1 | 1 |
| 254 | 0 1 1 1 1 1 1 1 | 0 | 1 | 0 | 1 | 1 | 0 | 1 | 0 | 0 | 1 | 1 | 1 | 0 | 1 | 0 | 0 | 1 | 1 | 1 | 1 | 0 | 1 | 1 | 1 |
| 255 | 1 1 1 1 1 1 1 1 | 1 | 1 | 0 | 0 | 0 | 1 | 1 | 0 | 1 | 1 | 1 | 1 | 1 | 1 | 1 | 0 | 1 | 1 | 1 | 1 | 0 | 0 | 0 | 1 |

What is claimed is:

1. A digital service unit for transferring digital data between first and second subscriber loops and a computer forming part of a computer network comprising a multipoint network which includes a plurality of network unit with at least one of said network units comprising said digital service unit, said network units coupled to telephone system communication links and communicating with each other on said communication links, transmitting and receiving digital data in a framed mode in which said data is organized into frames on said communication links, each said frame including synchronization data, command data, error correcting data, and user data, said digital service unit comprising:

means for storing an address identifying said digital service unit;

receiving means for receiving a said frame on said first subscriber loop;

first control means for generating command data in response to a command included in the said command data of a said received frame;

second control means for executing a command specified by the said command data included in said received frame provided said command data indicates said stored address as the target thereof;

computer port means for transmitting user data to and receiving user data from said computer;

multiplexer means for generating a said frame including said received user data, said multiplexer means further comprising subscriber loop output port means for transmitting said generated frame on said first subscriber loop; and demultiplexer means for separating said user data from a said received frame and for transmitting said user data on said computer port means, said demultiplexer means including subscriber loop input port means for receiving said frame on said second subscriber loop.

2. The digital service unit of claim 1 further comprising decrypting means for correcting transmission errors in said received frame, said transmission correcting means utilizing said error correcting data in said received frame.

3. The digital service unit of claim 1 further comprising FIFO buffer means for accumulating user data received on said computer port means, said multiplexer means further comprising means for varying number of bits of user data in said generated frame in response to the number of bits of data stored in said FIFO buffer.

4. The digital service unit of claim 1 wherein said computer port means further comprises means for receiving an inactive signal from said computer indicating that said data processor is not sending data to said digital service unit and wherein said frame generating means inserts a predetermined said command into each said frame generated while said inactive signal is being received.

5. The digital service unit of claim 1 wherein said second control means further comprises error detecting means for detecting transmission errors in said received frame, said error detecting means utilizing said error correcting data included in said frame.

6. The digital service unit of claim 5 wherein said error detecting means further comprises means for determining an error rate related to the rate at which errors are detected thereby and means, responsive to a predetermined one of said commands, for inserting data specifying said error rate into the said command data of a said frame generated by said multiplexing means.

7. The digital service unit of claim 6 wherein said digital service unit further comprises means for specifying one of two states, master or slave, for said digital service unit, wherein the rate at which said data frames are transmitted on said first subscriber loop and received on said second subscriber loop is specified by a said commands, said rate being chosen from a plurality of predetermined rates.

8. The digital service unit of claim 7 wherein said error detecting means further comprises means for storing a maximum error rate and means for inserting a command into the next said frame generated by said multiplexing means if said digital service unit is in said slave state, said command specifying that said determined error rate was greater than said maximum error rate.

9. The digital service unit of claim 8 wherein said multiplexing means inserts a command in the next frame generated thereby specifying a lower said rate if said digital service unit is in said master state and said error detecting means determines that said error rate is greater than said maximum error rate.

10. The digital service unit of claim 8 wherein said error detecting means further comprises means for storing a minimum error rate and means for inserting a command into the next said frame generated by said multiplexing means if said digital service unit is in said slave state, said command specifying that said determined error rate was less than said minimum error rate.

11. The digital service unit of claim 10 wherein said multiplexing means inserts a command in the next frame generated thereby specifying a lower transmission rate if said digital service unit is in said master state, said error detecting means determines that said error rate is less than said minimum error rate, and said digital service unit has received a frame containing a said command specifying that the error detecting means in at least one digital service unit in the sleeve state has detected an error rate less than said minimum error rate.

12. The digital service unit of claim 1 further comprising command port means for receiving commands to be executed by said digital service unit or by another said network unit, each said command to be executed by another said network unit being transmitted in the said command data of a said frame transmitted by said subscriber loop output port means.

13. The digital service unit of claim 1 further comprising means for transmitting and receiving data in a non-frame mode, wherein said subscriber loop input port means further comprising means for receiving non-frame data words on said first subscriber loop at a predetermined data rate and generating user data therefrom;

said subscriber loop output port means further comprises means for transmitting non-frame data words on said second subscriber loop;

said multiplexing means further comprises means for generating said non-frame data words from said received user data; and said digital service unit further comprises means for detecting a switch sequence comprising a predetermined sequence of non-frame data words, said digital service unit entering said non-frame mode in response to the receipt of predetermined said command data, and said digital service unit resuming transmission in said frame mode when said digital service unit detects said switch sequence on said subscriber loop input port means.

14. The digital service unit of claim 1 further comprising means responsive to a predetermined said command and a predetermined value for said stored address, for causing said stored address to match an address specified in said command.

15. The digital service unit of claim 1 further comprising:

reverse channel port means for receiving reverse channel data from said computer and transmitting reverse channel data thereto;

wherein said multiplexing means further comprises means for inserting said received reverse channel data into a said frame transmitted by said digital service unit; and said demultiplexing means further comprises means for extracting said reverse channel data which was inserted into a said frame by another said digital service unit and for coupling said received reverse channel data to said reverse channel port means for transmission to said computer.

* * * * *

UNITED STATES PATENT AND TRADEMARK OFFICE
CERTIFICATE OF CORRECTION

PATENT NO. : 5,062,104

DATED : October 29, 1991

INVENTOR(S) : Lubarsky

It is certified that error appears in the above-identified patent and that said Letters Patent is hereby corrected as shown below:

Column 4, line 59, after "links", delete "(".

Column 8, line 16, after "last", insert --6--.

Column 8, line 22, after "16", insert -- -- --.

Column 9, line 49, delete "IN" and insert therefor --In--.

Column 9, line 57, delete "channel" and insert therefor --control--.

Column 11, line 8, delete "channel" and insert therefor --control--.

Column 11, line 10, delete "sing" and insert therefor --using--.

Column 11, line 41, before "Q", insert --hence--.

Column 14, line 34, after "412", insert --,--.

Column 14, line 36, after "shifted", insert --,--.

Column 14, line 60, delete "8 bits" and insert therefor --8-bit--.

Column 17, line 28, delete "AND" and insert therefor --and--.

Column 19, line 6, delete "kbits/sec" and insert therefor --Kbits/sec--.

Column 19, line 68 after "invention", insert --,--.

Column 21, line 6, delete "kbits/sec" and insert therefor --Kbits/sec--.

Column 31, line 59, delete "unit" and insert therefor --units--.

Column 33, line 46 delete "commands" and insert therefor --command--.

UNITED STATES PATENT AND TRADEMARK OFFICE
CERTIFICATE OF CORRECTION

PATENT NO. : 5,062,104

DATED : October 29, 1991

INVENTOR(S) : Lubarsky

It is certified that error appears in the above-identified patent and that said Letters Patent is hereby corrected as shown below:

Column 34, line 13 delete "sleeve" and insert therefor --slave--.

In the abstract line 12 delete "varied" and insert therefor --vary--.

Column 7, line 59, after "on", delete "the".

Column 18, line 46, delete "can not" and insert therefor --cannot--.

Column 19, line 50, delete "to" and insert therefor --of--.

Column 20, line 61, delete "can not" and insert therefor --cannot--.

Signed and Sealed this

Tenth Day of August, 1993

Attest:

MICHAEL K. KIRK

Attesting Officer

Acting Commissioner of Patents and Trademarks